(12) United States Patent
Takahashi

(10) Patent No.: US 8,913,325 B2
(45) Date of Patent: Dec. 16, 2014

(54) DECENTRATION OPTICAL SYSTEM, AND IMAGE DISPLAY APPARATUS AND IMAGING APPARATUS INCORPORATING THE SAME

(75) Inventor: Koichi Takahashi, Hachioji (JP)

(73) Assignee: Olympus Corporation, Tokyo (JP)

( * ) Notice: Subject to any disclaimer, the term of this patent is extended or adjusted under 35 U.S.C. 154(b) by 460 days.

(21) Appl. No.: 13/199,591

(22) Filed: Sep. 2, 2011

(65) Prior Publication Data
US 2012/0057242 A1    Mar. 8, 2012

(30) Foreign Application Priority Data

Sep. 6, 2010 (JP) ................. 2010-198659

(51) Int. Cl.
| | |
|---|---|
| G02B 27/14 | (2006.01) |
| G02B 23/00 | (2006.01) |
| G02B 17/00 | (2006.01) |
| G02F 1/1335 | (2006.01) |
| G03B 21/00 | (2006.01) |
| G02B 13/18 | (2006.01) |
| H04N 5/225 | (2006.01) |
| G02B 17/08 | (2006.01) |
| G02B 27/01 | (2006.01) |

(52) U.S. Cl.
CPC .......... *G02B 13/18* (2013.01); *G02B 2027/011* (2013.01); *H04N 5/2254* (2013.01); *G02B 17/086* (2013.01); *G02B 2027/0178* (2013.01); *G02B 27/0172* (2013.01)

USPC ............. 359/631; 359/410; 359/732; 349/11; 353/11

(58) Field of Classification Search
USPC ............. 359/409–410, 462, 466, 638–639, 359/13–14, 603–636, 404, 407; 351/158, 351/41, 111, 121; 345/7–9, 156; 353/11–12, 28, 119; 349/11
See application file for complete search history.

(56) References Cited

U.S. PATENT DOCUMENTS

| | | | |
|---|---|---|---|
| 8,184,350 B2* | 5/2012 | Saito | ................ 359/13 |
| 2001/0022689 A1* | 9/2001 | Takeyama | ............ 359/625 |
| 2002/0051299 A1* | 5/2002 | Togino et al. | .......... 359/633 |

FOREIGN PATENT DOCUMENTS

| | | |
|---|---|---|
| JP | 2002-116404 | 4/2002 |
| JP | 2004-325985 | 11/2004 |
| JP | 2006-003879 | 1/2006 |
| JP | 3924348 | 3/2007 |
| JP | 2007-094175 | 4/2007 |
| JP | 2008-076429 | 4/2008 |

\* cited by examiner

*Primary Examiner* — Dawayne A Pinkney
(74) *Attorney, Agent, or Firm* — Kenyon & Kenyon LLP

(57) ABSTRACT

The invention provides a decentration optical system comprising at least five optical surfaces. The optical surfaces are each decentered with respect to an axial chief ray in the Y-Z plane in the XYZ coordinate space, and at least one surface is decentered in the X-Z plane orthogonal to the Y-Z plane. At least two of the multiple optical surfaces are rotationally asymmetric surfaces, and at least one of the at least two rotationally asymmetric surfaces is a rotationally asymmetric surface having an X odd-numbered degree term.

22 Claims, 16 Drawing Sheets

DECENTRATION OPTICAL SYSTEM, AND IMAGE DISPLAY APPARATUS AND IMAGING APPARATUS INCORPORATING THE SAME

BACKGROUND OF THE INVENTION

The present invention relates to a decentration optical system using a rotationally asymmetrical surface, and an optical apparatus such as an image display apparatus and an imaging apparatus, each with such a decentration optical system incorporated inside.

So far, it has been known to use a prism having a plurality of optical surfaces as an optical system for viewing an image display device. In such a prism, light exiting out from the display device enters the prism. Then, the light is reflected within the prism, and leaves the prism, arriving at the viewer's eyeball so that an image may be viewed as an enlarged virtual image.

For such an image-viewing optical system, JP(A) 2008-76429 discloses a prism that forms a primary image by at least three reflective surfaces for projection onto the eyeball. JP(A)'s 2007-94175 and 2004-325985 disclose eyeglasses with a hologram device mounted on their lens segment.

For another optical system used on image display devices, JP(A) 2006-3879 discloses projecting light through a light guide and an eyepiece lens onto the eyeball. U.S. Pat. No. 3,924,348 discloses a decentration optical system in which a space surrounded by three surfaces is filled up with a medium having a refractive index of 1 or greater, and at least one surface is defined by a curved surface having no symmetrical plane. Two image display devices are so aligned in line that aberrations can be corrected even when, in a vergence layout, axial chief rays for the image display devices and the decentration optical system are located in a twisted manner.

SUMMARY OF THE INVENTION

One aspect of the invention provides a decentration optical system having at least five optical surfaces provided, wherein the optical surfaces are each decentered with respect to an axial chief ray in a Y-Z plane in an XYZ coordinate space; at least one of the multiple optical surfaces is decentered in an X-Z plane orthogonal to the Y-Z plane; at least two of the multiple optical surfaces are rotationally asymmetric surfaces; and at least one of the at least two rotationally symmetric surfaces is a rotationally asymmetric surface having an X odd-numbered degree term.

According to one aspect of the invention, the condition: $5° \leq \alpha \leq 45°$ is satisfied, where $\alpha$ is an angle in the X-Z plane that an axial chief ray entering the decentration optical system forms with an axial chief ray exiting out from the decentration optical system.

According to one aspect of the invention, in the decentration optical system, the space formed by the at least five optical surfaces is filled up with an optical medium having a refractive index of 1.3 or greater.

Further, the decentration optical system comprises five optical surfaces; light exiting out from an image display surface for displaying an image enters the decentration optical system and thereafter exits out from the decentration optical system to form an exit pupil for projection onto the viewer's eyeball; and in order along an optical path taken by light from entering the decentration optical system up to exiting out from the decentration optical system, there are a first surface that is a combined entrance and transmitting surface, a second surface that is an internal reflection surface in opposition to the first surface, a third surface that is a combined internally reflecting and transmitting surface in opposition to the second surface, a fourth surface that is an internal reflection surface in opposition to the third surface and adjacent to the second surface, and a fifth surface that is an internal reflection surface adjacent to the fourth surface and in opposition to the third surface.

Further in one aspect of the invention, at least one internal reflection at the third surface of the decentration optical system is defined by total reflection.

Further in one aspect of the invention, the third surface of the decentration optical system is a rotationally asymmetric surface.

Further in one aspect of the invention, the third surface of the decentration optical system has negative power in the Y-Z plane.

Further in one aspect of the invention, the fourth surface of the decentration optical system is a rotationally asymmetric surface.

Further in one aspect of the invention, the fifth surface of the decentration optical system is a rotationally asymmetric surface.

Further in one aspect of the invention, the fifth surface of the decentration optical system has positive power in the Y-Z plane.

Further in one aspect of the invention, the second surface of the decentration optical system is a rotationally asymmetric surface.

Further in one aspect of the invention, the second surface of the decentration optical system is a surface that is tilted or shifted in the X-Z plane.

Further in one aspect of the invention, the fifth surface of the decentration optical system is a surface that is tilted or shifted in the X-Z plane.

Further in one aspect of the invention, the first surface of the decentration optical system is a surface that is tilted or shifted in the X-Z plane.

Further in one aspect of the invention, the third surface of the decentration optical system is a rotationally asymmetric surface having an X odd-numbered degree term.

Further in one aspect of the invention, the fifth surface of the decentration optical system is a rotationally asymmetric surface having an X odd-numbered degree term.

Further in one aspect of the invention, the second surface of the decentration optical system is a rotationally asymmetric surface having an X odd-numbered degree term.

Further in one aspect of the invention, the fourth surface of the decentration optical system is a rotationally asymmetric surface having an X odd-numbered degree term.

One aspect of the invention provides an image display apparatus that comprises the decentration optical system, and is designed to present an enlarged virtual image to the viewer when the image display device is located in opposition to the first surface and the viewer's eyeball is located in opposition to the transmitting area of the third surface.

Further in one aspect of the invention, the image display apparatus is designed such that the exit pupil of the decentration optical system is formed near the exit window of the third surface or between the third surface and the viewer's eyeball.

Further in one aspect of the invention, the image display apparatus is designed such that when an image out of the image display device is captured in from the entrance surface of the decentration optical system before it exits out from the exit surface of the decentration optical system in a substantially parallel light form for projection onto the viewer's eyeball, the image display device is rotated about an axial chief ray ($\gamma$) for location.

Further in one aspect of the invention, the imaging apparatus comprises the decentration optical system, and is adapted to take an outside-world image with an imaging device located in opposition to the first surface and an aperture stop located in front of and near the transmitting area of the third surface.

Further in one aspect of the invention, the imaging apparatus is designed such that when an image is taken through an imaging device externally of the decentration optical system with substantially parallel light incident from the entrance pupil on the decentration optical system, the imaging device is rotated about an axial chief ray (γ) for location.

According to the invention as described above, it is possible to provide a decentration optical system which has a high flexibility in location, and in which the entrance and exit optical axes have a certain angle rather than lying coaxially in the respective Y-Z and X-Z planes so that an image on the image display device can be projected as a virtual image onto the viewer's eyeball.

Still other objects and advantages of the invention will in part be obvious and will in part be apparent form the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

Figure 1:
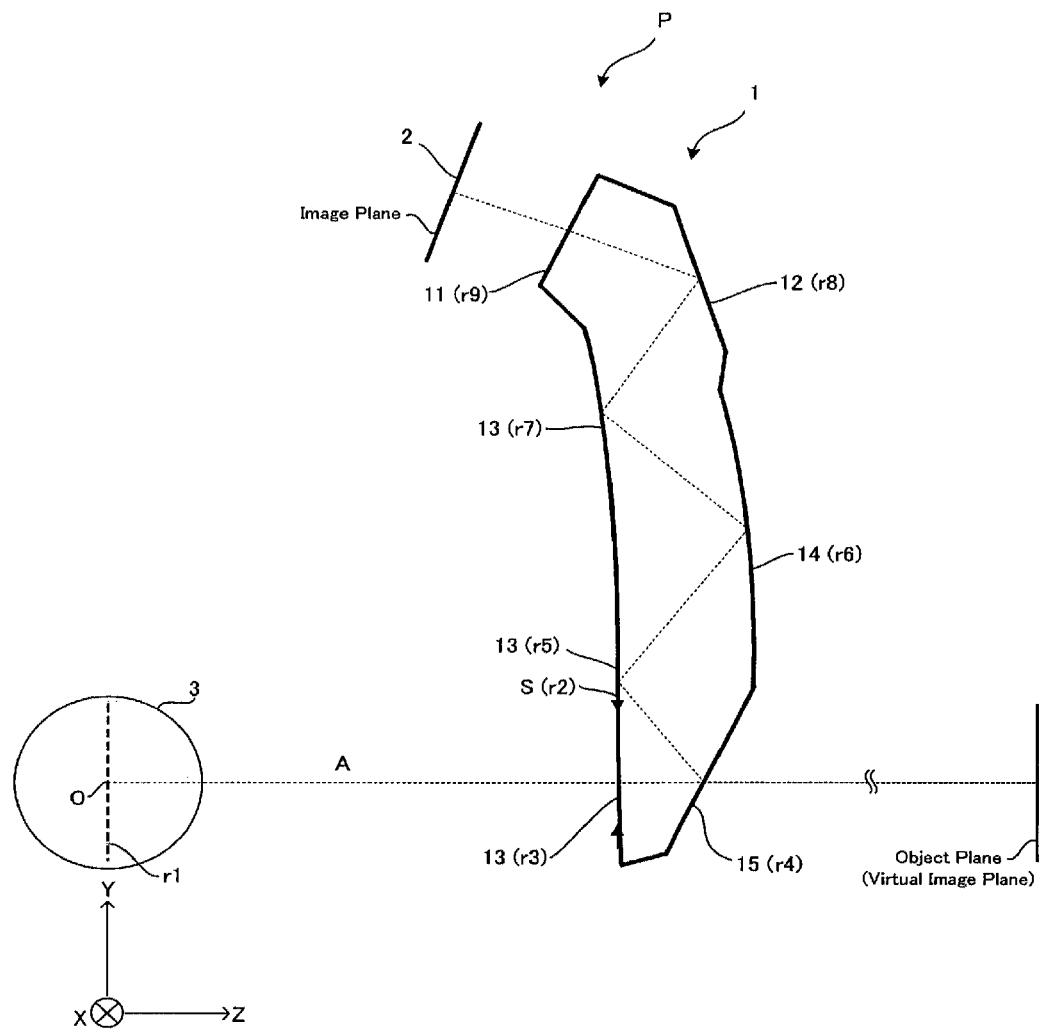
FIG. 1 is illustrative in construction of the decentration optical system according to a specific embodiment of the invention.

The decenteration optical system 1 of the invention comprises at least five optical surfaces. It is then preferable that the at least five optical surfaces are each decentered with respect to an axial chief ray in the Y-Z plane in the XYZ coordinate space; at least one optical surface is decentered in the X-Z plane orthogonal to the Y-Z plane; at least two of the multiple optical surfaces are rotationally asymmetric surfaces; and at least one of the at least two rotationally asymmetric surfaces is a rotationally asymmetric surface having an X odd-numbered degree term.

Such an arrangement enables the decentration optical system comprising at least five optical surfaces to be decentered (shifted or tilted) with respect to the axial chief ray in the Y-Z plane; so the optical axis defined by the axial chief ray does not lie coaxially in the Y-Z plane. In another parlance, the axis of light entering the decentration optical system and the axis of light exiting out from the decentration optical system can be set in different directions in the Y-Z plane. When such decentration optical system 1 is used typically as an image display apparatus P, the position of an image display device 2 for displaying images and the position of the eyeball of a viewer who views an image on that image display device 2 will be able to be more or less freely determined in the Y-Z plane.

Further, if at least one surface is configured in such a way as to be decentered with respect to the axial chief ray in the X-Z plane orthogonal to the Y-Z plane, the optical axis defined by the axial chief ray does not again lie coaxially. In another parlance, the axis of light entering the decentration optical system and the axis of light exiting out from the decentration optical system can be set in different directions. When such decentration optical system 1 is used typically as the image display apparatus P, the position of the image display device 2 for displaying images and the position of the eyeball of the viewer who views an image on that image display device 2 will be able to be more or less freely determined in the X-Z plane.

In the thus assembled decentration optical system 1, however, aberrations resulting from the decentration of the optical surfaces and different from ordinary Seidel aberrations, or the so-called decentration aberrations, occur in the Y-Z plane. Upon the occurrence of those decentration aberrations by the decentration of the optical surfaces having power, coma and astigmatism that are not usually produced on the optical axis occur too, together with off-axis field surface tilts, asymmetric distortion, etc. Those rotationally asymmetric aberrations cannot be corrected by spherical and aspheric surfaces that are rotationally symmetric ones. Therefore, the inventive decentration optical system 1 is designed to use rotationally asymmetric curved surfaces for correction of the aberrations.

The amount of decentration of the multiple optical surfaces in the Y-Z plane is large; so the amount of the decentration aberrations produced would grow large too. Therefore, configuring at least two of the multiple optical surfaces as rotationally asymmetric surfaces could work more in favor of correction of the decenteration aberrations.

And if at least one surface is decentered in the X-Z plane orthogonal to the Y-Z plane, the axial chief ray that defines the optical axis of the optical system will have an angle in the X-Z plane.

According to such a decentration optical system as described above, the entrance axial chief ray and the exit axial chief ray can be located at an angle with each other in the respective Y-Z and X-Z planes. For this reason, when it comes to the image display apparatus P, the decentration optical system 1, the image display device 2, etc. may be located at any desired positions with respect to the viewer's eyeball in the Y-Z plane; so the image display apparatus P can be of compact shape, and the wearer will look quite natural with less burdensomeness.

Because of no need for setting the axial chief ray coaxially in the X-Z plane too, for instance, the decentration optical system 1 and the image display device 2 may be located at positions shifted with respect to the viewer's eyeball so that light rays exiting out from the decentration optical system 1 are obliquely incident on the viewer's eyeball. For this reason, even with the decentration optical system 1 and the image display device 2 attached parallel to the sidepieces (temple) segment of eyeglasses worn by the viewer, light rays from obliquely below can go toward the center of the viewer's eyeball. According to such image display apparatus P, therefore, the viewer may view an image on the image display device 2 positioned obliquely below irrespective of the shape of the sidepieces of eyeglasses or other holder segment.

It is thus possible to provide a decentration optical system which has a high flexibility in location, in which the entrance and exit optical axes have a certain angle, rather than lying coaxially, in the respective Y-Z and the X-Z planes, and which enables an image on an image display device to be projected onto the viewer's eyeball.

When the inventive decentration optical system 1 is applied to a practically available imaging apparatus, it is possible to reduce the whole optical system in terms of size and weight, and to locate an imaging device at any three-dimensionally desired position.

It is preferable to satisfy the condition: $5°\leq\alpha\leq45°$, where $\alpha$ is the angle in the X-Z plane that the axial chief ray entering the decentration optical system 1 forms with the axial chief ray exiting out from the decentration optical system 1.

If, in such an arrangement, at least one surface is decentered in the X-Z plane orthogonal to the Y-Z plane, the axial chief ray that defines the optical axis of the optical system will then have an angle in the X-Z plane. In that case, there is a change in the directions of the incident light beam and the exiting light beam; for instance, when the decentration optical system is applied to the image display apparatus P, the image display device 2 and the viewer's eyeball can be set by that change at different angles with respect to the decentration optical system.

As far as such a layout is concerned, even when the image display apparatus P with the inventive decentration optical system 1 mounted on it is positioned horizontally with respect to the viewer, it is possible for the axis of light (axial chief ray) to exit out from the image display apparatus P at a certain angle.

For the decentration optical system 1, it is preferable that the space formed by at least five optical surfaces is filled up with an optical medium having a refractive index of 1.3 or greater.

As the space formed by at least five optical surfaces of the decentration optical system 1 is filled up with the optical medium having a refractive index of 1.3 or greater, it allows the decentration optical system 1 to be configured as one single optical member. In other words, an optical surface fabricated and set up in a fabrication process will provide one surface for the decentration optical system 1; so there will be no need for adjusting the relative positions of the respective surfaces. In addition, light transmits through the decentration optical system 1; so if there is a critical or greater angle set as the angle of incidence, then the light will be subjected to total reflection inside.

According to such decentration optical system 1, it is possible to provide an optical system comprising at least five surfaces in the form of a single prism. Specifically, the respective optical surfaces are configured in independent shapes and combined together into a mold. By use of that mold, it is possible to fabricate optical elements of stabilized quality. In addition, the total reflection makes sure two functions: reflection and transmission are achievable with one optical surface, working in favor of size reduction of the optical system.

Referring here to the makeup of the decentration optical system 1 in the case where light exiting out from the image display plane for displaying images enters, and then exits out from, the decentration optical system 1 to form an exit pupil S for projection onto the viewer's eyeball, it is preferably made up of, in order along a path taken by light from entering the decentration optical system 1 up to exiting out from the decentration optical system 1, the first surface that is a combined entrance and transmitting surface, the second surface that is an internal reflection surface in opposition to the first surface, the third surface that is a combined internal reflection and transmitting surface in opposition to the second surface, the fourth surface that is an internal reflection surface in opposition to the third surface and adjacent to the second surface, and the fifth surface that is an internal reflection surface adjacent to the fourth surface and in opposition to the third surface.

According to the decentration optical system made up of such optical surfaces, the third surface is in opposition to the second, the fourth and the fifth surface so that light is subjected to multiple reflections within the left and right surfaces of the decentration optical system. As a consequence, the decentration optical system can practically have a long optical path albeit being of very small size. The decentration optical system may also be configured in a substantially bar-like shape having a curved surface, which is in conformity to the outer configuration of the glass of eyeglasses to be described later. This decentration optical system may thus be used as a part of the glass frame of eyeglasses.

Such an optical element is in a small, substantially bar-like shape so that when it is located in front of the viewer's eyeball, an area likely to be in the way to the field of view of the viewer for the outside world can be diminished or minimized.

Moreover, the decentration optical system is capable of two internal reflections at the third surface, before and after which internal reflections occur at the second, the fourth and the fifth surface. Accordingly, if the second surface is inclined at a proper angle, it is then possible to locate the image display device at any desired angle, and if the fifth surface is inclined at a proper angle, it is then possible for the viewer to have the eyeball set at any desired position and angle.

The thus assembled decentration optical system enables the image display device to be located, with some flexibility, at such a relative position and angle as to be not in the way to the viewer.

Referring to the image display apparatus incorporating such a decentration optical system, the user could use the see-through feature to get rid of blind spots, if any, and locate the image display device at a position that is not in the way; so the user could wear, and use, the image display apparatus in a more comfortable fashion. The decentration optical system, because of its high shape flexibility, may be used as a part of the frame of eyeglasses so that the wearer could look objectively quite natural.

Preferably, at least one internal reflection at the third surface makes use of the total reflection feature.

If such internal reflection at the third surface has the total reflection feature, the third surface can bring about internal reflection on its own without recourse to any reflection coating. The total-reflection area, because of being transparent, is so transparent to light that when the third surface is used as the entrance or exit surface, there is no need for taking special means such as half-mirror coating or HOE.

The total-reflection feature makes sure an almost 100% reflectivity, a figure higher than could be achieved with metal coating; so it is possible to hold back any lowering of the whole efficiency.

As a consequence, the decenteration optical system can be fabricated at lower costs without recourse to any special coating or the like. In addition, the high reflectivity means that there can be the apparatus provided that is more satisfactory in terms of efficiency and power savings.

For the decentration optical system 1, it is preferable that the third surface is a rotationally asymmetric surface.

The third surface, because of being a combined transmitting and two internal-reflections surface, are capable of exerting a great effect on aberration correction upon subjected to transmission and reflection, resulting in an image well corrected for aberrations. Consequently, when the decentration optical system is used as the image display apparatus P, there can be a clear-cut, less distorted image viewed. When used as an imaging apparatus, there can also be a less distorted, high-resolution image taken.

For the decentration optical system 1, it is preferable that the third surface has negative power in the Y-Z plane.

The third surface is a two-internal-reflections surface, and it is then desirable that each internal reflection is defined by total reflection. Under total-reflection conditions, the angle of incidence at the point of reflection must be equal to or greater than the critical angle. Given the prism vitreous material has a refractive index n, the critical angle θc is given by θc=arcsin (1/n). For instance when n=1.5, there will be θc=41.81°.

Accordingly, if the angle of incidence on the third surface is set at 41.81° or greater, there will then be total reflection occurring. Given the third surface has positive power, however, the normal to the third surface turns in the direction of light incident from obliquely above at a certain site, with the result that the angle of incidence will tend to get small, rendering it difficult for all light beams to have an angle of incidence greater than the critical angle. Still, if the third surface has negative power with incident light striking on a convex portion, it works in favor of the satisfaction of the total-reflection conditions, because the angle of incidence tends to grow large for all light beams.

Such construction of the decentration optical system or prism 1 enables it to be fabricated at low costs because of no need for any special coating or the like. In addition, the high reflectivity makes sure the system provides a high-efficiency, energy-savings apparatus.

For the decentration optical system 1, it is preferable that the fourth surface is a rotationally asymmetric surface.

The fourth surface is an internal-reflection surface and located at a position halfway across the decentration optical system 1, where each light beam will have a relatively large sectional area. Accordingly, if that surface is configured in a rotationally asymmetric form, it has a great effect on correction of spherical aberrations and coma upon subjected to reflection.

Such construction of the decentration optical system 1 enables images well corrected for aberrations to be obtained. Accordingly, when it is used as the image display apparatus P, there can be clear-cut, less distorted images viewed. When used as an imaging apparatus, there can also be less distorted, high-resolution images taken.

For the decentration optical system 1, it is preferable that the fifth surface is a rotationally asymmetric surface.

The fifth surface is an internal-reflection surface. In view of the image display apparatus P here, that surface is positioned just in front of the exit pupil and exit surface of the decentration optical system 1; so the sectional areas of light beams differing in the exit angle (angle of view) are substantially same and relatively large, and coma is likely to occur by the decentration (tilting) of that surface. When it comes to aberrations occurring at the fifth surface, it is preferable to correct them at that surface. To put it another way, keeping decentration aberrations small works in favor of improvements in the performance of the whole optical system.

Such construction of the decentration optical system 1 allows for images that are well corrected for aberrations. Accordingly, when it is used as the image display apparatus P, there can be clear-cut, less distorted images viewed. When used as an imaging apparatus, there can also be less distorted, high-resolution images taken.

For the decentration optical system 1, it is preferable that the fifth surface has positive power in the Y-Z plane.

Effectively, the fifth surface is a surface having positive power capable of internal reflection. Given the third surface having negative power, it is necessary to let one or more of the first, the second, the fourth and the fifth surface have positive power for the purpose of constructing the decentration optical system in the form of an imaging system. In consideration of incidence of substantially parallel light on that surface from the exit pupil thereby forming the imaging plane, however, the fifth surface should have positive power, because the power profile of the optical system comprises, in order from the object side toward the image plane, negative, positive, negative, (positive, negative or zero), and negative power: the incident light will have positive power just after striking on the surface of negative power, resulting in the ability of the optical system to have positive power throughout.

Such construction of the decentration optical system 1 allows for images well corrected for aberrations. Accordingly, when it is used as an image display apparatus, there can be clear-cut, less distorted images viewed. When used as an imaging apparatus, there can also be less distorted, high-resolution images taken.

For the decentration optical system 1, it is preferable that the second surface is a rotationally asymmetric surface.

The second surface is an internal-reflection surface, and positioned near the image plane of the decentration optical system; so light beams remain relatively small. As that surface is configured in a rotationally asymmetric surface form, it works effectively for correction of off axis aberrations. Especially when there is a large angle of view, it works effectively for correction of distortion.

Such construction of the decentration optical system 1 allows for images well corrected for aberrations. Accordingly, when it is used as an image display apparatus, there can be clear-cut, less distorted images viewed. When used as an imaging apparatus, there can also be less distorted, high-resolution images taken.

For the decentration optical system 1, it is preferable that the second surface is a surface that is tilted or shifted in the X-Z plane.

The second surface is tilted or shifted in the X-Z plane. When it comes to the inventive decentration optical system 1 used as the image display apparatus P, light exiting out from the image display device arrives at the second surface just after entering the optical system from the first or transmitting surface, at which second surface a light beam comes to have an angle in the X-Z plane.

According to such construction of the decentration optical system 1, the decentration of the second surface within the X-Z plane allows a light beam out of the image display device to come to have an angle within the X-Z plane, with the result that it will exit out from the decentration optical system 1 at that angle.

For the decentration optical system 1, it is preferable that the fifth surface is a surface that is tilted or shifted in the X-Z plane.

The fifth surface is tilted or shifted in the X-Z plane. When it comes to the decentration optical system 1 used as the image display apparatus P, light exiting out from the image display device 2 goes to the fifth surface just before it goes toward the viewer's eyeball via the decentration optical system 1, at which fifth surface a light beam comes to have an angle within the X-Z plane.

According to such construction of the decentration optical system 1, the decentration of the fifth surface within the X-Z plane allows a light beam out of the image display device 2 to come to have an angle within the X-Z plane, with the result that it will exit out from the decentration optical system 1 at that angle. For instance, when the decentration optical system 1 is adopted for the image display apparatus P, it may be located at a position that is not in the way to the viewer's field of view.

For the decentration optical system 1, it is preferable that the first surface is a surface that is tilted or shifted in the X-Z plane.

The first surface is tilted or shifted in the X-Z plane. When it comes to the decentration optical system 1 used as the image display apparatus P, a light beam exiting out from the image display device and going toward the viewer's eyeball via the decentration optical system 1 comes to have an angle within the X-Z plane. Here, if the entrance or first surface is decentered within the X-Z plane, it is then possible to adjust the axis of incident light.

According to such construction of the decentration optical system 1, the decentration of the first surface within the X-Z plane causes a light beam out of the image display device 2 to be bent at the first surface before it enters the decentration optical system 1. In other words, the angle of the light beam incident on the decentration optical system 1 is so regulated that sophisticated angle adjustment can be implemented.

For the decentration optical system 1, it is preferable that the third surface is a rotationally asymmetric surface having an X odd-numbered degree term.

The third surface is a rotationally asymmetric surface having an X odd-numbered degree term. This enables the third surface to function as a surface capable of transmission and two internal reflections. Upon transmission and reflection, the third surface is able to exert a great effect on correction of aberrations within the X-Z plane too.

For the decentration optical system 1, it is preferable that the fifth surface is a rotationally asymmetric surface having an X odd-numbered degree term.

The fifth surface is an internal-reflection surface. In view of the image display apparatus P here, that surface is positioned just in front of the exit pupil and exit surface of the decentration optical system 1; so the sectional areas of light beams differing in the exit angle (angle of view) are substantially same and relatively large, and coma is likely to occur by decentration (tilting) of that surface. When it comes to aberrations occurring at the fifth surface, it is preferable to correct them at that surface. To put it another way, keeping decentration aberrations small works in favor of improvements in the performance of the whole optical system in the X-Z plane too.

For the decentration optical system 1, it is preferable that the second surface is a rotationally asymmetric surface having an X odd-numbered degree term.

The second surface is an internal-reflection surface, and positioned near the image plane of the optical system; so light beams remain relatively small. As that surface is configured in a rotationally asymmetric surface form having an X odd-numbered degree order, it works in favor of correction of off-axis aberrations within the X-Z plane. Especially when there is a large angle of view, it is effective for correction of distortion.

For the decentration optical system 1, it is preferable that the fourth surface is a rotationally asymmetric surface having an X odd-numbered degree term.

The fourth surface is an internal-reflection surface, and located at a position halfway across the decentration optical system 1, where light beams come to have relatively large sectional areas. As that surface is configured in such a way as to have an X odd-numbered degree term, it exerts a great effect on correction of spherical aberrations and coma in the X-Z plane upon reflection.

Such construction of the decentration optical system 1 allows for images well corrected for aberrations. Accordingly, when it is used as an image display apparatus, there can be clear-cut, less distorted images viewed. When used as an imaging apparatus, there can also be less distorted, high-resolution images taken.

The inventive imaging apparatus comprises the image display device 2 located in opposition to the first surface of the decentration optical system 1, with the viewer's eye located in opposition to the transmitting area of the third surface, so that an enlarged virtual image can be presented to the viewer.

Light emanating out of the image display device 2 enters the decentration optical system 1 from the first surface, and is internally reflected at the second, the third, the fourth, the third and the fourth surface five times, before it exits out from the third surface in a substantially parallel light form, striking upon the pupil of the viewer's eyeball. The thus assembled imaging apparatus P makes it possible for the viewer to view an enlarged virtual image.

For the imaging apparatus P, it is preferable that the exit pupil of the decentration optical system is formed near the exit window of the third surface or between the third surface and the viewer's eyeball.

As the exit pupil of the image display device 2 is formed near the exit window of the third surface or between the third surface and the viewer's eyeball, it helps minimize shadings of light beams at the rim of the image being viewed.

With the imaging apparatus P of such construction, it is possible for the viewer to view images that are clear-cut as far as the periphery of the screen.

For the image display apparatus P, it is preferable that when an image out of the image display device 2 is taken in the decentration optical system 1 from the entrance surface and exits out from the exit surface in a substantially parallel light form for projection onto the viewer's eyeball, the image display device 2 is rotated around the axial chief ray (γ) for location.

When the decentration optical system 1 is decentered in both the Y-Z plane and the X-Z plane, the ensuing image is rotated about the optical axis. As the image display device 2 is rotated in response to that, it is possible for the viewer to view the image from the image display device 2 as an image having an ordinary aspect ratio without being rotated.

In the inventive imaging apparatus, the imaging device is located in opposition to the first surface of the decentration optical system 1 and an aperture stop is disposed in front of and near the transmitting area of the third surface so that outside-world images can be taken.

Specifically, the aperture stop having a round aperture is located below and near the third surface of the decentration optical system 1, and a CCD or other imaging device is located in opposition to the first surface. Light incident from the third surface of the decentration optical system through the aperture stop is subjected to five internal reflections at the fifth, the third, the fourth, the third and the second surface, and exits out from the first surface, arriving at the imaging device where the light can be collected.

With such an arrangement, it is possible to achieve an imaging apparatus reduced in terms of size and weight.

For the imaging apparatus, it is preferable that when an imaging device located externally of the decentration optical system 1 is used to take images with substantially parallel light incident on the decentration optical system 1 from the entrance pupil, the image display device is rotated around the axial chief ray (γ) for location.

When the decentration optical system is decentered in both the Y-Z plane and the X-Z plane, the ensuing image is rotated around the optical axis. As the image display device is rotated in response to that, it brings the imaging device in alignment with the image being formed so that an image having an ordinary aspect ratio can be taken.

The decentration optical system 1 here is now explained with reference to specific examples.

Specific constituting parameters of the prism optical system 1, given later, have been determined on the basis of the results of back ray tracing wherein, as shown in FIG. 1, a center ray A passing through a phantom surface r1 set near the position where the eyeball 3 is located goes through the prism optical system 1 toward the image display device 2.

As depicted in FIG. 1, the center ray A exiting out from the prism optical system 1 forms a virtual image plane (referred to as an object plane in back ray tracing) on the right side of the prism optical system 1 upon viewing at a viewing position in back ray tracing. Here the phantom surface r1 is supposed to be set at a position 1 m away from the virtual image plane toward the exit side, with the point of intersection of the phantom surface r1 with the center ray A as the origin O. Then, a direction of the center chief ray from the origin O toward the prism optical system 1 side is defined as the Z-axis positive direction; the direction orthogonal to the Z-axis on the image display device 2 side from the origin O is defined as the Y-axis positive direction; and the sheet plane of FIG. 1 is defined as the Y-Z plane. Then, an axis that forms a right-handed orthogonal coordinate system with the Y- and Z-axes is defined as the X-axis positive direction.

Given to each decentered surface are the amount of decentration of the coordinate system—on which that surface is defined—from the center of the origin O of the optical system 1 (X, Y and Z in the X-, Y- and Z-axis directions) and the angles (α, β, γ(°)) of tilt of the coordinate system for defining each surface about the X-, Y- and Z-axes of the coordinate system defined on the origin of the optical system.

It is here to be noted that the positive α and β mean counterclockwise rotation with respect to the positive directions of the respective axes, and the positive γ means clockwise rotation with respect to the positive direction of the Z-axis. Referring to the α, β, γ rotation of the center axis of a certain surface, the coordinate system for defining each surface is first α rotated counterclockwise about the X-axis of the coordinate system defined on the origin of the coordinate system. Then, it is β rotated counterclockwise about the Y-axis of the thus rotated, new coordinate system, and finally γ rotated clockwise about the Z-axis of the thus rotated, new another coordinate system.

When a specific surface of the optical function surfaces forming the optical system of each example and the subsequent surface form together a coaxial optical system, there is a surface separation given. Besides, the radii of curvature of the surfaces, and the refractive indices and Abbe constants of the media are given as usual.

It is also noted that coefficient terms to which data are not given in the following constituting parameters are zero. The refractive indices and Abbe constants on a d-line basis (587.56 nm wavelength) are given, and length is given in mm. The decentration of each surface is represented by the quantity of decentration from a reference surface, as mentioned above.

The surface shape of the free-form surface used in the embodiments of the invention is defined by the following formula (a). Suppose here that the Z-axis of that defining formula is the axis of the free-form surface.

$$Z = (r^2/R) / [1 + \sqrt{\{1 - (1+k)(r/R)^2\}}] + \sum_{j=1}^{\infty} Cj X^m Y^n$$

Here the first terms of Formula (a) is the spherical term, and the second term is the free-form surface term.

In the spherical term,
R is the radius of curvature of the vertex,
k is the conic constant, and
r is $\sqrt{(X^2+Y^2)}$.
The free-form surface term is:

$$\sum_{j=1}^{66} Cj X^m Y^n = C1 + C2X + C3Y + C4X^2 + C5XY + C6Y^2 + C7X^3 +$$
$$C8X^2Y + C9XY^2 + C10Y^3 + C11X^4 + C12X^3Y + C13X^2Y^2 +$$
$$C14XY^3 + C15Y^5 + C16X^5 + C17X^4Y + C18X^3Y^2 + C19X^2Y^3 +$$
$$C20XY^4 + C21Y^5 + C22X^6 + C23X^5Y + C24X^4Y^2 + C25X^3Y^3 +$$
$$C26X^2Y^4 + C27XY^5 + C28Y^6 + C29X^7 + C30X^6Y + C31X^5Y^2 +$$
$$C32X^4Y^3 + C33X^3Y^4 + C34X^2Y^5 + C35XY^6 + C36Y^7 \ldots$$

where Cj (j is an integer of 1 or greater) is a coefficient.

In general, that free-form surface has no plane of symmetry in both the X-Z plane and the Y-Z plane. However, by bringing all the odd-numbered degree terms with respect to X down to zero, the free-form surface can have only one plane of symmetry parallel with the Y-Z plane. For instance, this may be achieved by bringing down to zero the coefficients for the terms C2, C5, C7, C9, C12, C14, C16, C18, C20, C23, C25, C27, C29, C31, C33, C35, . . . in the above defining formula (a).

By bringing all the odd-numbered terms with respect to Y down to zero, the free-form surface can have only one plane of symmetry parallel with the X-Z plane. For instance, this may be achieved by bringing down to zero the coefficients for the terms C3, C5, C8, C10, C12, C14, C17, C19, C21, C23, C25, C27, C30, C32, C34, C36, . . . in the above defining formula.

If any one of the directions of the aforesaid plane of symmetry is used as the plane of symmetry and decentration is implemented in a direction corresponding to that, for instance, the direction of decentraton of the optical system with respect to the plane of symmetry parallel with the Y-Z plane is set in the Y-axis direction and the direction of dencentration of the optical system with respect to the plane of symmetry parallel with the X-Z plane is set in the X-axis direction, it is then possible to improve productivity while, at the same time, making effective correction of rotationally asymmetric aberrations occurring from decentration.

The aforesaid defining formula (a) is given for the sake of illustration alone as mentioned above: the feature of the invention is that by use of the rotationally asymmetric surface having only one plane of symmetry, it is possible to correct rotationally asymmetric aberrations occurring from decentration while, at the same time, improving productivity. It goes without saying that the same advantages are achievable even with any other defining formulae.

FIG. 1 is illustrative in conception of the image display apparatus P incorporating the decentration optical system 1 according to the inventive embodiment.

As depicted in FIG. 1, the decentration optical system 1 according to the first embodiment comprises at least five optical surfaces. Each optical surface is decentered with respect to the axial chief ray in the Y-Z plane in the XYZ coordinate space; at least one surface is decentered in the X-Z plane orthogonal to the Y-Z plane; at least two of the multiple optical surfaces are rotationally asymmetric surfaces; and at least one of the at least two rotationally asymmetric surfaces is a rotationally asymmetric surface having an X odd-numbered degree term.

In the image display apparatus P, the image display device 2 is located in opposition to the first surface 11 of the decentration optical system 1 that is the entrance surface on which light is incident, and the viewer's eyeball 3 is located in opposition to the third surface 13 that functions as the transmitting area of the surface from which light exits out, so that an enlarged virtual image can be presented to the viewer.

Example 1 of the inventive decentration optical system 1 is now explained.

Figure 2:
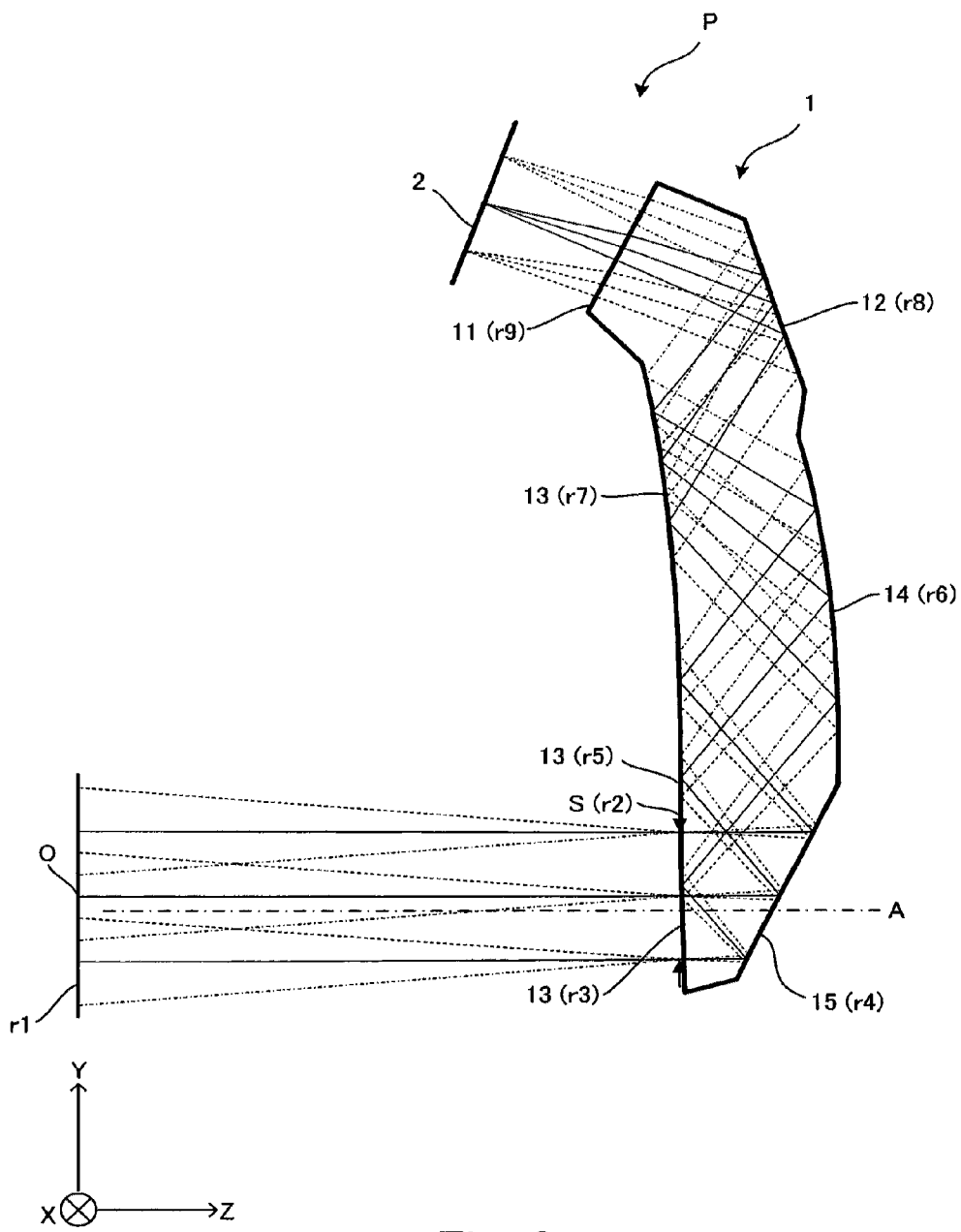
FIG. 2 is an optical path diagram in the Y-Z section for the decentration optical system according to Example 1.
Figure 3:
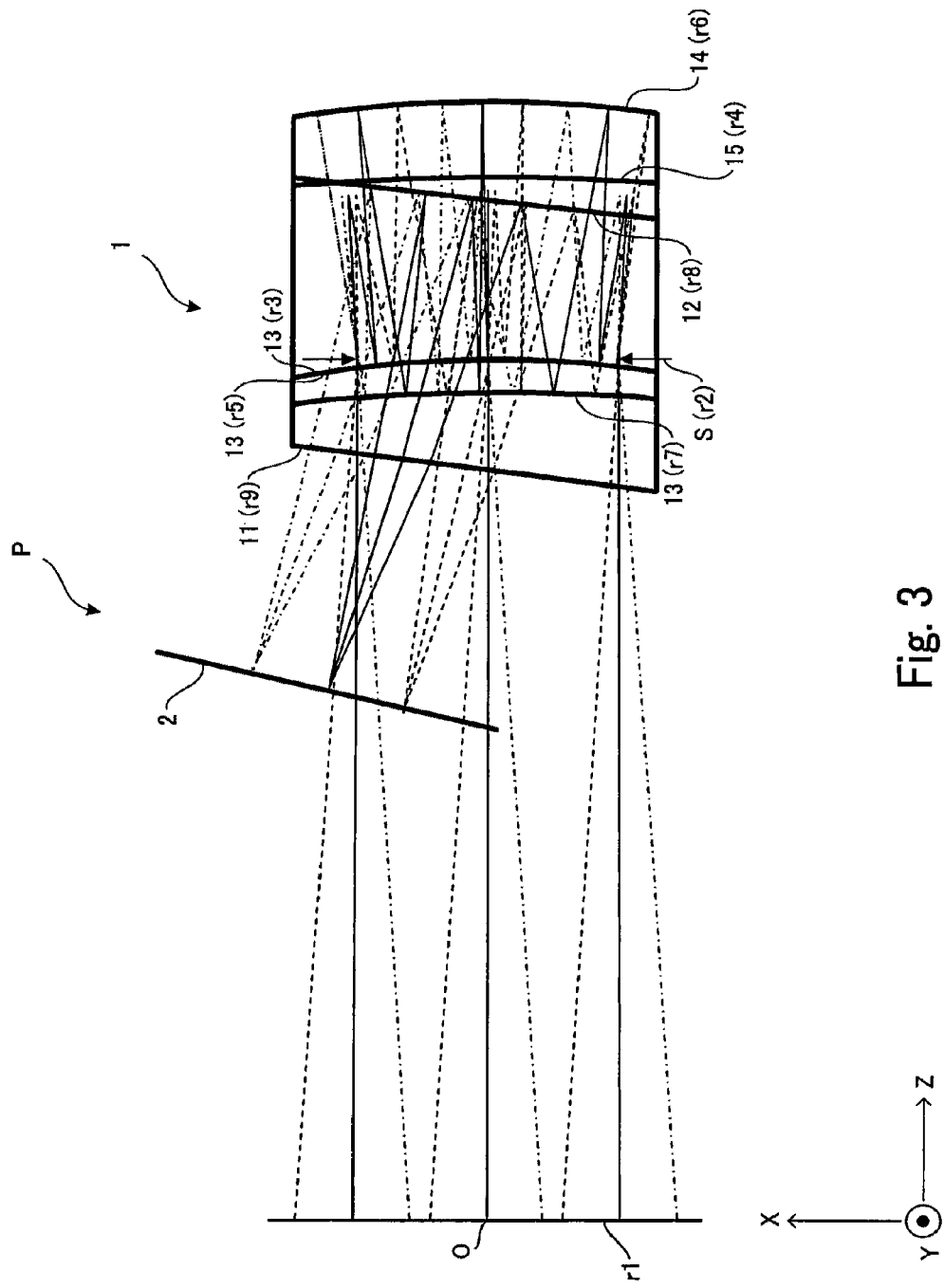
FIG. 3 is an optical path diagram in the X-Z section for the decentration optical system according to Example 1.
Figure 4:
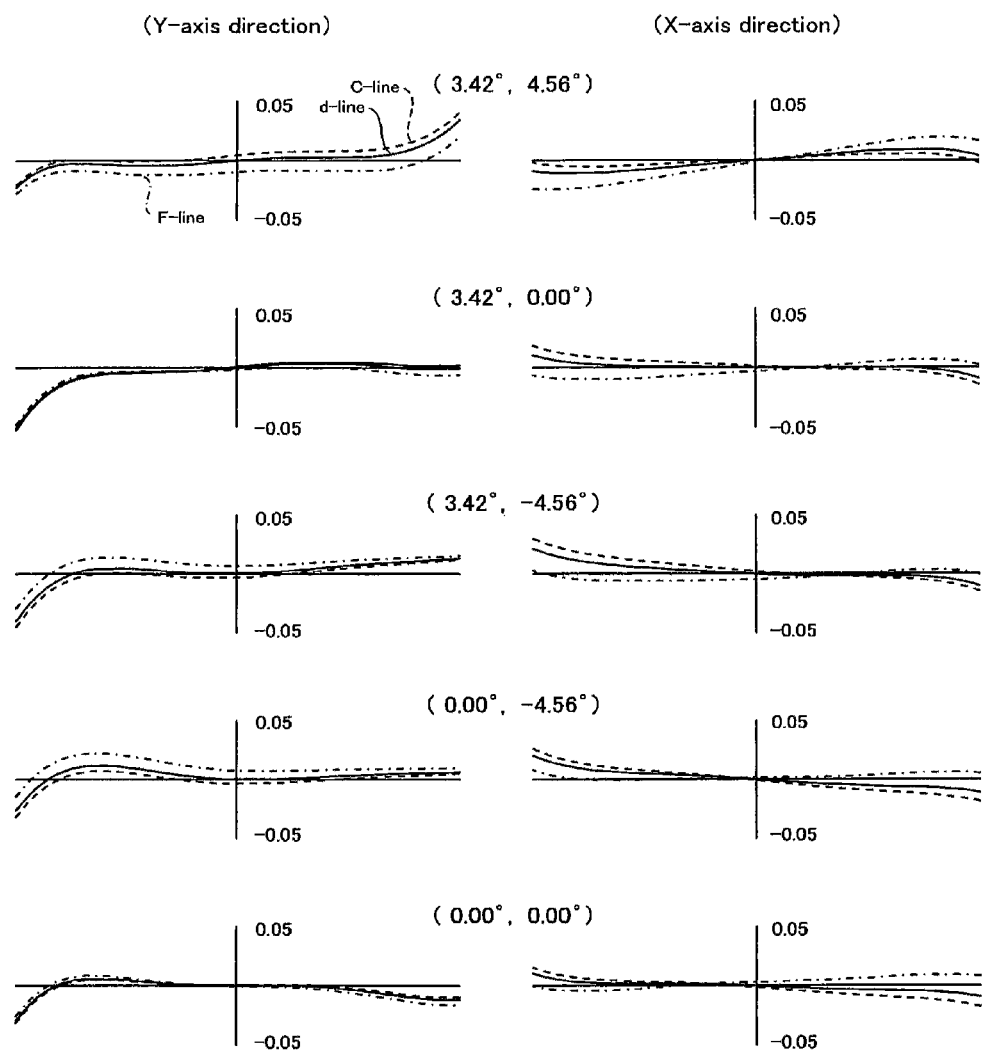
FIG. 4 is a set transverse aberration diagrams for the whole optical system according to Example 1.
Figure 5:
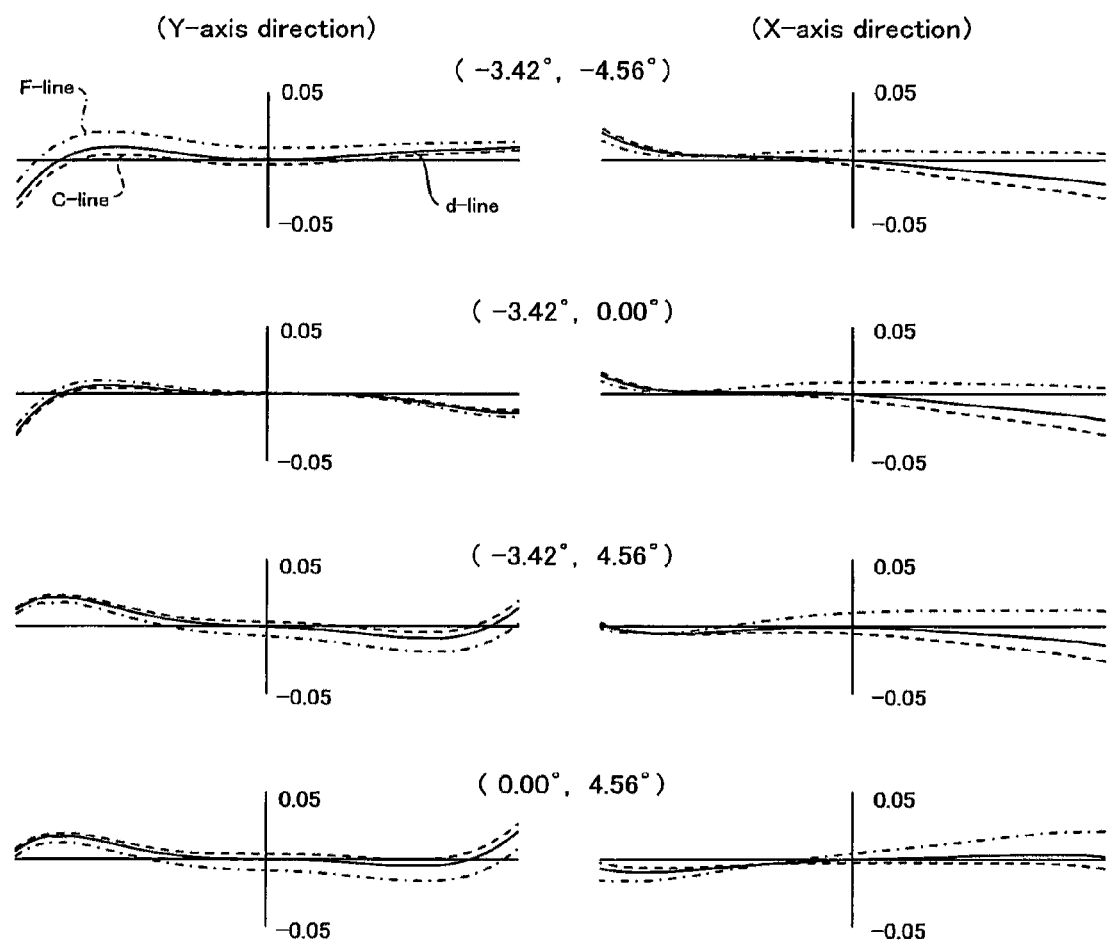
FIG. 5 is a set of transverse aberration diagrams for the whole optical system according to Example 1.

FIGS. 2 and 3 are illustrative in the Y-Z and X-Z sections of the image display apparatus P equipped with the decentration optical system 1 of Example 1, respectively, and FIGS. 4 and 5 are sets of transverse aberrations diagrams for the whole optical system.

The image display apparatus P of Example 1 comprises the decentration optical system 1 and the image display device 2.

The decentration optical system 1 is formed using five optical surfaces, each having an optical function. The first surface 11 is located in opposition to the image display device 2, and has one transmission. The second surface 12 is located in opposition to the image display device 2 but faces away from the first surface 11, and has one internal reflection. The third surface 13, opposing to the second surface 12 as well as the fourth 14 and the fifth surface 15 to be referred to later, is located on the image display device 2 side, and has two internal reflections plus one transmission.

The fourth surface 14 opposes to the third surface 13 but faces away from the image display device 2, and has one internal reflection. The fifth surface 15 opposes to the third surface 13 but faces away from the image display device 2, and has one internal reflection. There is an exit pupil S provided near the third or transmitting surface 13.

In Example 1, the third 13, the fourth 14, and the fifth surface 15 is a free-form surface that functions as a rotationally asymmetric surface. Specifically, the third surface 13 is a free-form surface having an X odd-numbered degree term; the fourth surface 14 is a free-form surface having only an X even-numbered degree term; and the fifth surface 15 is a free-form surface having an X odd-numbered degree term. Note here that the first 11, and the second surface 12 is formed of a plane.

At the time of back ray tracing, a light beam passing through the exit pupil S transmits through the third surface 13, entering the decentration optical system 1. Then, it is internally reflected at the fifth surface 15, internally reflected at the third surface 13, internally reflected at the fourth surface 14, again internally reflected at the third surface 13, internally reflected at the second surface 12, and transmits through the first surface 11, exiting out from the decentration optical system 1. After leaving the decentration optical system 1, the light beam enters the image display device 2.

In the image display apparatus P, the image display device 2 is located in opposition to the first surface 11 of the decentration optical system 1 that is the entrance surface from which light enters the decentration optical system 1, and the viewer's eye is located in opposition to the third surface 13 that functions as the transmitting area of the surface from which light exits out, so that an enlarged virtual image can be presented to the viewer.

Figure 6:
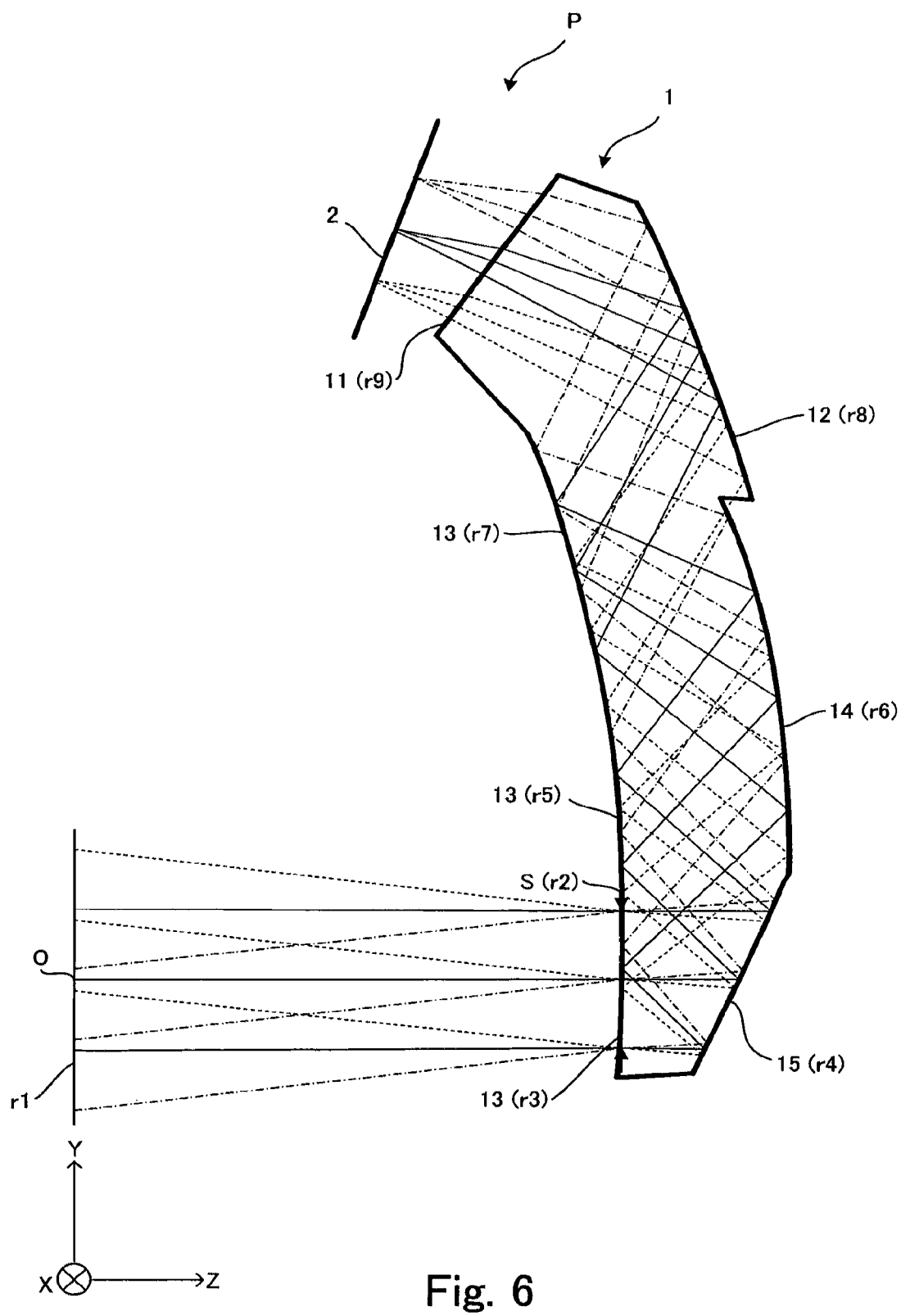
FIG. 6 is an optical path diagram in the Y-Z section for the decentration optical system according to Example 2.
Figure 7:
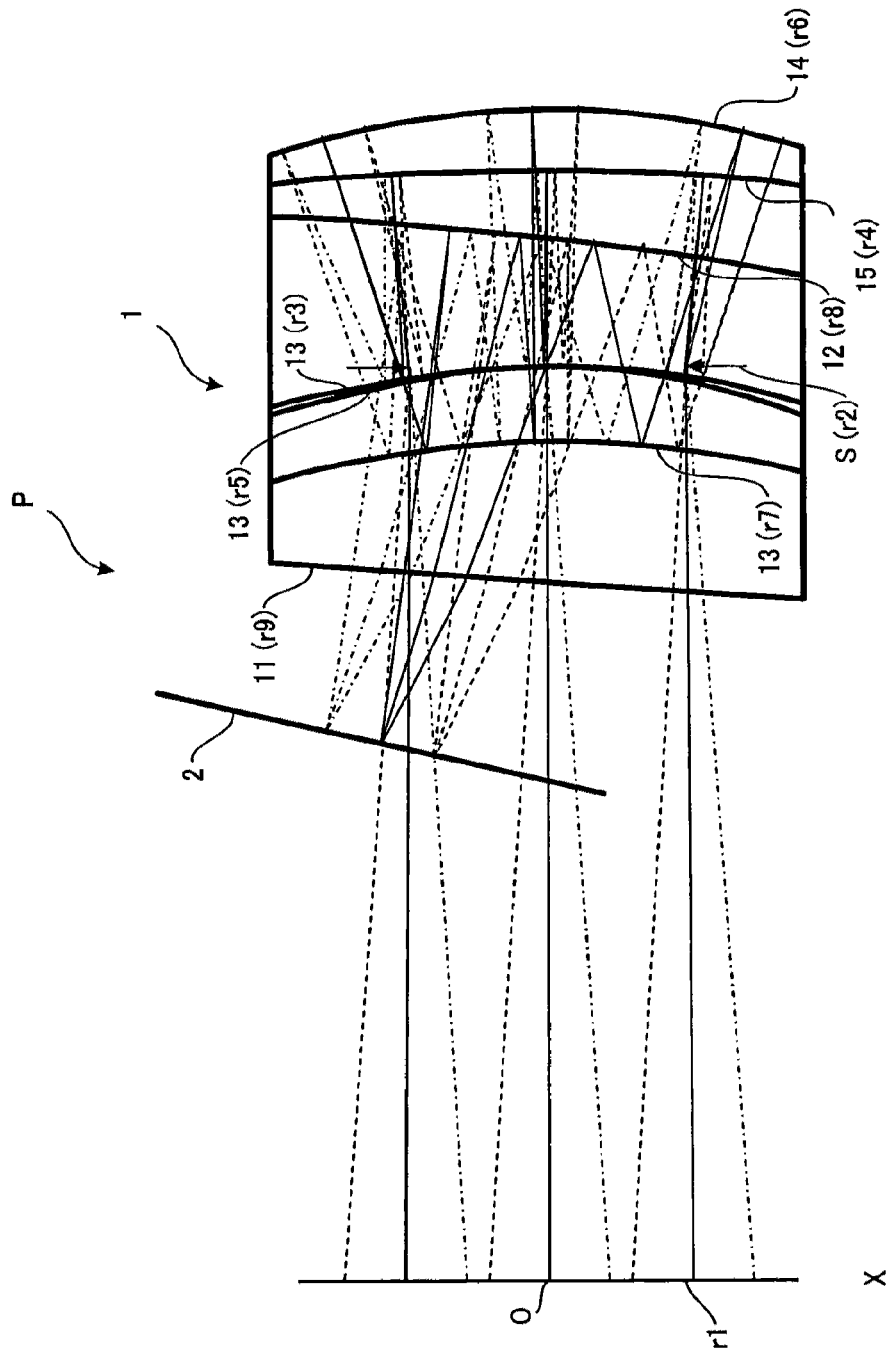
FIG. 7 is an optical path diagram in the X-Z section for the decentration optical system according to Example 2.
Figure 8:
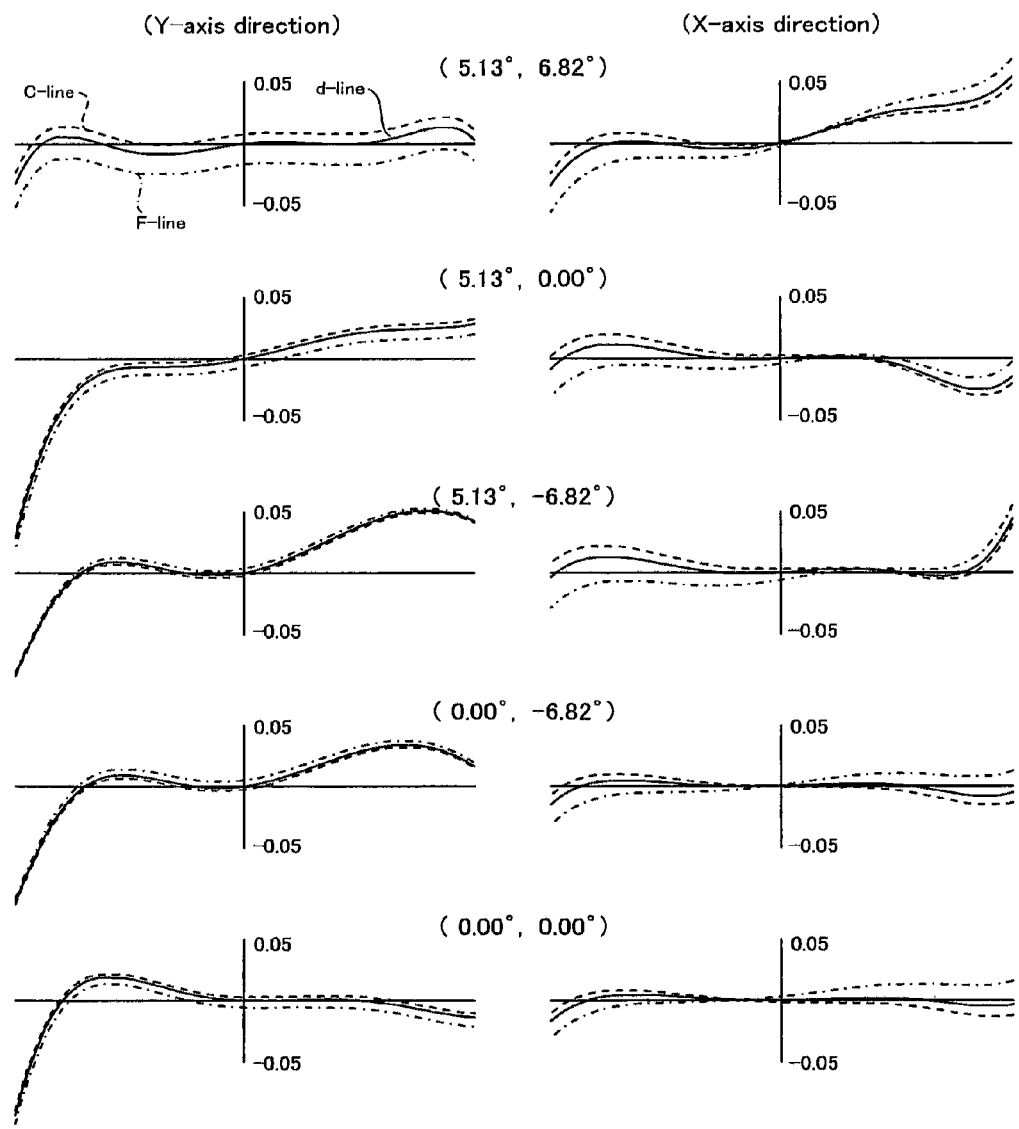
FIG. 8 is a set of transverse aberration diagrams for the whole optical system according to Example 2.
Figure 9:
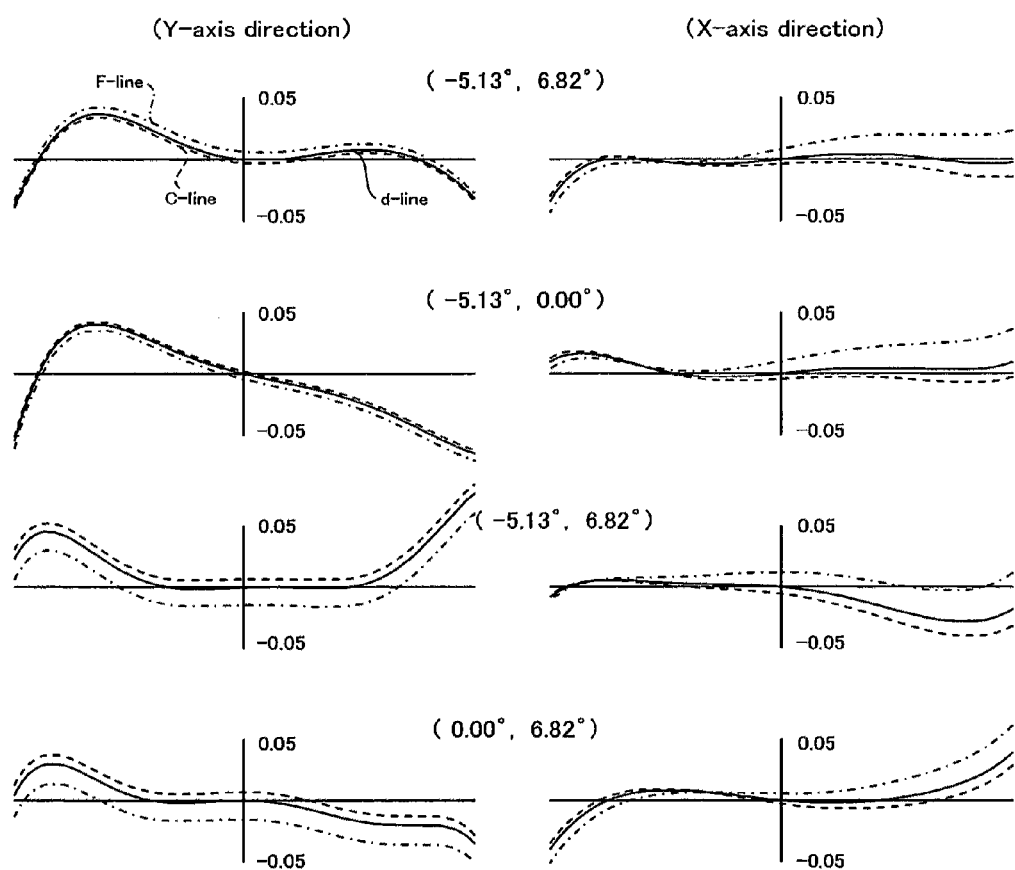
FIG. 9 is a set of transverse aberration diagrams for the whole optical system according to Example 2.

FIGS. 6 and 7 are illustrative in the Y-Z and X-Z sections of the image display apparatus P equipped with the decentration optical system 1 of Example 2, respectively, and FIGS. 8 and 9 are sets of transverse aberration diagrams for the whole optical system.

The image display apparatus P of Example 2 comprises the decentration optical system 1 and the image display device 2.

The decentration optical system 1 is formed using five optical surfaces, each having an optical function. The first surface 11 is located in opposition to the image display device 2, and has one transmission. The second surface 12 is located in opposition to the first surface 11 but faces away from the image display device 2, and has one internal reflection. The third surface 13, opposing to the second surface 12 as well as the fourth 14 and the fifth surface 15 to be described later, is located on the image display device 2 side, and has two internal reflections plus one transmission.

The fourth surface 14 opposes to the third surface 13 but faces away from the image display device 2, and has one internal reflection. The fifth surface 15 opposes to the third surface 13 but faces away from the image display device 2, and has one internal reflection. There is an exit pupil S provided near the third or transmitting surface 13.

In Example 2, the second 12, the third 13, the fourth 14, and the fifth surface 15 is a rotationally asymmetric surface. Specifically, the second 12, and the third surface 13 is a free-form surface having an X odd-numbered degree term; the fourth surface 14 is a free-form surface having only an X even-numbered degree term; and the fifth surface 15 is a free-form surface having an X odd-numbered degree term. Note here that the first surface 11 is formed of a plane.

At the time of back ray tracing, a light beam passing through the exit pupil S transmits through the third surface 13, entering the decentration optical system 1. Then, it is internally reflected at the fifth surface 15, internally reflected at the third surface 13, internally reflected at the fourth surface 14, again internally reflected at the third surface 13, internally reflected at the second surface 12, and transmits through the first surface 11, exiting out from the decentration optical system 1. After leaving the decentration optical system 1, the light beam enters the image display device 2.

In the image display apparatus P, the image display device 2 is located in opposition to the first surface 11 of the decentration optical system 1 that is the entrance surface from which light enters the decentration optical system 1, and the viewer's eye is located in opposition to the third surface 13 that functions as the transmitting area of the surface from which light exits out, so that an enlarged virtual image can be presented to the viewer.

Tabulated below are the constituting parameters of Examples 1 and 2. Note here that in the following table, "FFS" stands for the free-form surface.

Example 1

| Surface No. | Radius of Curvature | Surface Separation | Decentration | Refractive Index | Abbe Constant |
|---|---|---|---|---|---|
| | Angle of view: Horizontal 6.84° Vertical 9.12° | | | | |
| Object Plane | ∞ | −1000.00 | | | |
| r1 | ∞ (Dummy Plane) | 0.00 | | | |
| r2 | ∞ (Exit Pupil) | 0.00 | Decentration(1) | | |
| r3 | FFS[1] | 0.00 | Decentration (2) | 1.5254 | 56.2 |
| r4 | FFS[2] | 0.00 | Decentration (3) | 1.5254 | 56.2 |
| r5 | FFS[1] | 0.00 | Decentration (2) | 1.5254 | 56.2 |
| r6 | FFS[3] | 0.00 | Decentration (4) | 1.5254 | 56.2 |
| r7 | FFS[1] | 0.00 | Decentration (2) | 1.5254 | 56.2 |
| r8 | ∞ | 0.00 | Decentration (5) | 1.5254 | 56.2 |
| r9 | ∞ | 0.00 | Decentration (6) | | |
| Image Plane | ∞ | 0.00 | Decentration (7) | | |

FFS[1]

| C4 | −2.291e−002 | C5 | −1.765e−003 | C6 | 2.612e−003 |
|---|---|---|---|---|---|
| C7 | −3.974e−005 | C8 | 3.471e−004 | C9 | 5.867e−005 |
| C10 | 2.178e−004 | C11 | −3.281e−005 | C12 | −1.364e−005 |
| C13 | 2.202e−005 | C14 | 1.069e−006 | C15 | −3.903e−005 |
| C16 | −1.009e−006 | C17 | 4.788e−008 | C18 | 1.970e−006 |
| C19 | −6.284e−007 | C20 | −1.241e−008 | C21 | 1.527e−006 |
| C22 | 2.716e−007 | C23 | 5.949e−008 | C24 | 7.843e−008 |
| C25 | −5.576e−008 | C26 | −7.025e−009 | C27 | −1.111e−009 |
| C28 | −2.061e−008 | | | | |

FFS[2]

| C4 | −1.197e−002 | C5 | −8.411e−004 | C6 | 2.154e−003 |
|---|---|---|---|---|---|
| C7 | −4.091e−005 | C8 | 3.916e−004 | C9 | 1.137e−004 |
| C10 | −5.298e−004 | C11 | −6.495e−006 | C12 | 5.546e−006 |
| C13 | −1.007e−005 | C14 | −5.394e−006 | C15 | 2.234e−005 |

FFS[3]

| C4 | −2.054e−002 | C6 | −6.736e−003 | C8 | 3.023e−004 |
|---|---|---|---|---|---|
| C10 | −3.166e−005 | C11 | −1.155e−005 | C13 | −8.948e−006 |
| C15 | −1.338e−005 | C17 | 1.453e−006 | C19 | −4.042e−007 |
| C21 | 2.479e−007 | | | | |

Decentration (1)

| X | 0.00 | Y | 0.00 | Z | 18.00 |
|---|---|---|---|---|---|
| α | 0.00 | β | 0.00 | γ | 0.00 |

Decentration (2)

| X | 0.00 | Y | −2.61 | Z | 18.07 |
|---|---|---|---|---|---|
| α | 2.01 | β | 0.00 | γ | 0.00 |

Decentration (3)

| X | 0.00 | Y | −1.09 | Z | 21.72 |
|---|---|---|---|---|---|
| α | −25.72 | β | 0.00 | γ | 0.00 |

Decentration (4)

| X | 0.00 | Y | 9.82 | Z | 24.73 |
|---|---|---|---|---|---|
| α | 2.02 | β | 0.00 | γ | 0.00 |

Decentration (5)

| X | 0.00 | Y | 27.99 | Z | 22.00 |
|---|---|---|---|---|---|
| α | 17.89 | β | 7.50 | γ | 0.00 |

Decentration (6)

| X | 0.00 | Y | 30.77 | Z | 15.22 |
|---|---|---|---|---|---|
| α | −25.91 | β | 8.66 | γ | 0.00 |

Decentration (7)

| X | 3.65 | Y | 32.75 | Z | 9.59 |
|---|---|---|---|---|---|
| α | −19.69 | β | 15.00 | γ | 0.00 |

Example 2

| Angle of view: Horizontal 6.84° Vertical 9.12° | | | | | |
|---|---|---|---|---|---|
| Surface No. | Radius of Curvature | Surface Separation | Decentration | Refractive Index | Abbe Constant |
| Object Plane | ∞ | −640.00 | | | |
| r1 | ∞ (Dummy Plane) | 0.00 | | | |
| r2 | ∞ (Exit Pupil) | 0.00 | Decentration (1) | | |
| r3 | FFS[1] | 0.00 | Decentration (2) | 1.5254 | 56.2 |
| r4 | FFS[2] | 0.00 | Decentration (3) | 1.5254 | 56.2 |
| r5 | FFS[1] | 0.00 | Decentration (2) | 1.5254 | 56.2 |
| r6 | FFS[3] | 0.00 | Decentration (4) | 1.5254 | 56.2 |
| r7 | FFS[1] | 0.00 | Decentration (2) | 1.5254 | 56.2 |
| r8 | FFS[4] | 0.00 | Decentration (5) | 1.5254 | 56.2 |
| r9 | ∞ | 0.00 | Decentration (6) | | |
| Image Plane | ∞ | 0.00 | Decentration (7) | | |

| FFS[1] | | | | | |
|---|---|---|---|---|---|
| C4 | −4.128e−002 | C5 | −9.216e−004 | C6 | −4.297e−003 |
| C7 | 1.134e−004 | C8 | 3.066e−003 | C9 | 2.687e−005 |
| C10 | 9.480e−004 | C11 | 5.238e−005 | C12 | −1.052e−005 |
| C13 | −1.010e−004 | C14 | 3.545e−007 | C15 | −1.564e−004 |
| C16 | 3.767e−007 | C17 | 5.254e−006 | C18 | 1.824e−007 |
| C19 | −6.216e−006 | C20 | 5.878e−009 | C21 | 7.764e−006 |
| C22 | −1.755e−006 | C23 | −1.766e−008 | C24 | 3.193e−007 |
| C25 | 2.088e−009 | C26 | 2.403e−007 | C27 | −6.327e−010 |
| C28 | −1.274e−007 | | | | |

| FFS[2] | | | | | |
|---|---|---|---|---|---|
| C4 | −8.733e−003 | C5 | −2.991e−004 | C6 | −5.071e−003 |
| C7 | 1.043e−005 | C8 | −3.405e−004 | C9 | −2.968e−006 |
| C10 | −3.611e−005 | C11 | 2.212e−005 | C12 | −2.694e−006 |
| C13 | −1.312e−004 | C14 | −1.222e−006 | C15 | 1.223e−005 |

| FFS[3] | | | | | |
|---|---|---|---|---|---|
| C4 | −3.133e−002 | C6 | −9.781e−003 | C8 | 3.977e−004 |
| C10 | 2.969e−004 | C11 | −2.128e−006 | C13 | −3.871e−005 |
| C15 | −4.617e−005 | C17 | 9.071e−007 | C19 | 2.308e−007 |
| C21 | 1.099e−006 | | | | |

| FFS[4] | | | | | |
|---|---|---|---|---|---|
| C4 | −6.772e−003 | C5 | 2.483e−004 | C6 | −3.547e−003 |
| C7 | 1.216e−004 | C8 | −3.862e−004 | C9 | −2.906e−004 |
| C10 | 1.453e−004 | C11 | 6.816e−005 | C12 | 3.378e−005 |
| C13 | 6.418e−005 | C14 | −5.529e−006 | C15 | −4.316e−005 |
| C16 | −1.295e−006 | C17 | 2.692e−006 | C18 | 3.029e−006 |
| C19 | 1.445e−005 | C20 | 2.068e−006 | C21 | −4.782e−006 |

| Decentration (1) | | | | | |
|---|---|---|---|---|---|
| X | 0.00 | Y | 0.00 | Z | 18.00 |
| α | 0.00 | β | 0.00 | γ | 0.00 |

| Decentration (2) | | | | | |
|---|---|---|---|---|---|
| X | 0.00 | Y | −0.71 | Z | 17.99 |
| α | −0.80 | β | 0.00 | γ | 0.00 |

| Decentration (3) | | | | | |
|---|---|---|---|---|---|
| X | 0.00 | Y | 4.60 | Z | 24.57 |
| α | −21.26 | β | 0.00 | γ | 0.00 |

| Decentration (4) | | | | | |
|---|---|---|---|---|---|
| X | 0.00 | Y | 7.45 | Z | 24.62 |
| α | 2.03 | β | 0.00 | γ | 0.00 |

| Decentration (5) | | | | | |
|---|---|---|---|---|---|
| X | 0.00 | Y | 27.66 | Z | 21.08 |
| α | 19.23 | β | 7.50 | γ | 0.00 |

| Decentration (6) | | | | | |
|---|---|---|---|---|---|
| X | 0.00 | Y | 31.72 | Z | 12.66 |
| α | −35.00 | β | 5.73 | γ | 0.00 |

| Decentration (7) | | | | | |
|---|---|---|---|---|---|
| X | 3.63 | Y | 32.98 | Z | 8.95 |
| α | −19.66 | β | 15.00 | γ | 0.00 |

Figure 10:
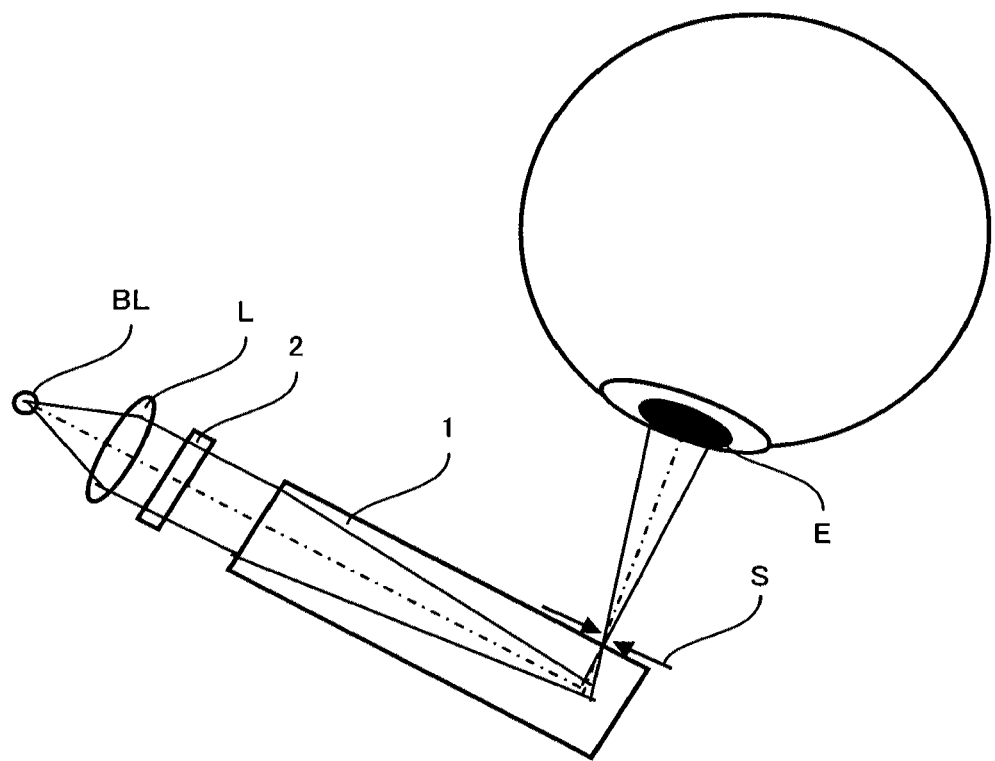
FIG. 10 is illustrative of the basic construction of the image display apparatus using the decentration optical system.

FIG. 10 is illustrative in schematic of the basic arrangement of the image display apparatus P incorporating the decentration optical system 1.

The object of the instant embodiment is to use the decentration optical system 1 and the image display device 2 thereby providing the image display apparatus P that can be reduced in terms of size, weight and cost, and allows the wearer to look objectively quite natural.

The image display apparatus P here uses a liquid crystal display device as the image display device 2. The use of the liquid crystal display device requires a backlight BL as a light source. In the embodiment here, a lighting lens L is interposed between the backlight BL and the image display device 2.

Such construction of the image display apparatus P here enables image-bearing light exiting out from the image display device 2 to be bent by the decentration optical system 1 having positive power toward the eyeball, and makes it possible for the viewer to view an image as a virtual image.

The vicinity of the exit portion may be designed to function as a sort of aperture stop S so that an image can be viewed even when the decentration optical system 1 per se is in a low-profile, elongated form.

When the image display device 2 is a liquid crystal display device, there is the need for using backlight BL and, in view of lighting efficiency, it is desired that an image at the light source is positioned near the exit window.

Preferably, the decentration optical system 1 is positioned somewhat outside of the front direction of the eyeball; so there is no risk of the decentration optical system 1 or an image projected by the decentration optical system 1 being in the way to the front of the field of view. Moreover, the optical path involved can be so curtailed that the decentration optical system 1 can be made more compact.

Figure 11:
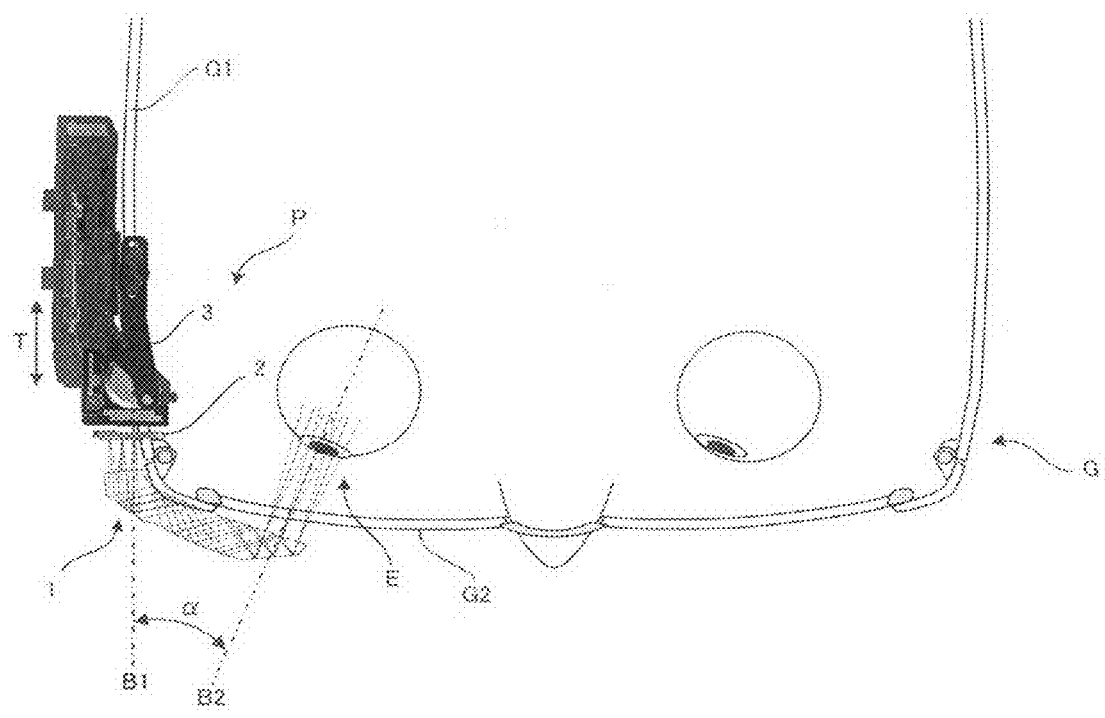
FIG. 11 is a top view of the image display apparatus using the decentration optical system.
Figure 12:
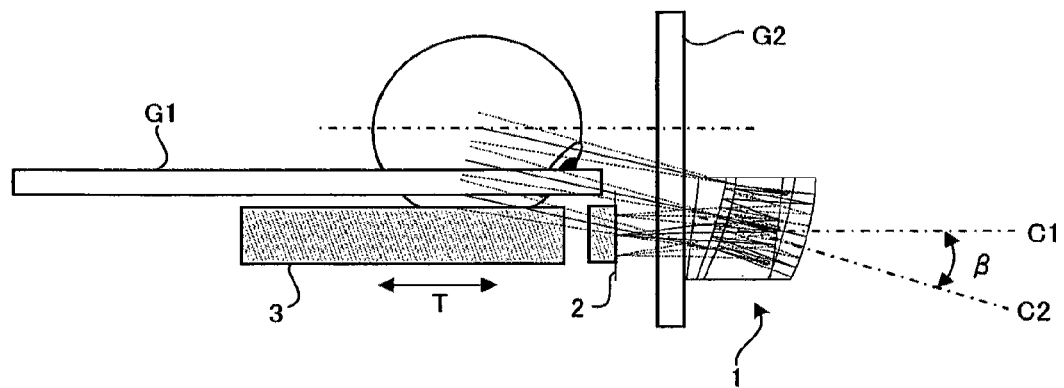
FIG. 12 is a side view of the image display apparatus using the decentration optical system.

FIGS. 11 and 12 are a top view and a side view of the image display apparatus P equipped with the decentration optical system, respectively, which is attached to eyeglasses G. In the embodiment here, the image display apparatus P comprises as main components the decentration optical system 1, the image display device 2 and an electric parts system 3. In the embodiment here, while the eyeglasses G are used for fixing the position of the image display apparatus P, it is to be understood that the position of the image display apparatus P may be fixed by suitable means such as a special-purpose means.

The electric parts system 3 supplies images to the image display device 2. This electric parts system 3 is built up of a power source part such as a battery, a storage part having image contents stored in it, a communication part for communication to other equipment, an interface part or the like. In the embodiment here, the electric parts system 3 is integral to the image display device 2, and screwed or otherwise fixed to the temple segment (sidepieces) G1 of eyeglasses G.

In the embodiment here, the decentration optical system 1, the electric parts system 3 and the image display device 2 are combined into a single unit that is then clipped or otherwise fixed to the eyeglasses G in such a way as to be positioned on the underside of the temple segment G1. It is here to be understood that the decentration optical system 1, the electric parts system 3 and the image display device 2 may be fixed to the eyeglasses G independently rather than combined into a single unit.

The location of the decentration optical system 1 relative to the image display device 2 may be moved back and forth for diopter adjustment; so there may be images provided depending on the viewer's visual acuity. In the embodiment here, the location of the electric parts system 3 inclusive of the image display device 2 is moved back and forth, as indicated by a double action arrow T, so that the distance between it and the decentration optical system 1 can be varied for diopter adjustment.

In the image display apparatus P attached to such eyeglasses G, image-bearing light exiting out from the image display device 2 turning in the front direction is directed toward the pupil via the decentration optical system 1. The decentration optical system 1 has positive power enough to enlarge an image from the image display device 2 so that the wearer can view it as a virtual image. Desirously in this case, the angle α that the first axial chief ray B1 exiting out from the center of the image display device 2 forms with the second axial chief ray B2 exiting out from the decentration optical system 1 and arriving at the center of the viewer's pupil is 0° to 40°.

FIG. 12 is a side view of how to wear the image display apparatus P shown in FIG. 11. In the embodiment here, the image display apparatus P in a single unit form is clipped or otherwise attached to the underside of the temple segment G1. The axial chief ray exiting out horizontally from the image display device 2 turning in the front direction of the viewer is directed obliquely upward by the decentration optical system 1, entering the viewer's eyeball.

With the decentration optical system 1 of the embodiment here, it is possible to turn the horizontally directed image-bearing light obliquely downward, or at a given angle in the X-Z plane as explained with reference to FIG. 3, into the viewer's eyeball and, hence, to locate the decentration optical system 1 below the front of the field of view. Thus, the decentration optical system 1 or an image projected by it is not in the way to the field of view.

It is here desired that the angle β in the X-Z plane that the axial chief ray C1 exiting out from the center of the image display device 2 forms with the axial chief ray C2 exiting out from the decentration optical system 1 and arriving at the center of the viewer's pupil is 5° to 45°.

Figure 13:
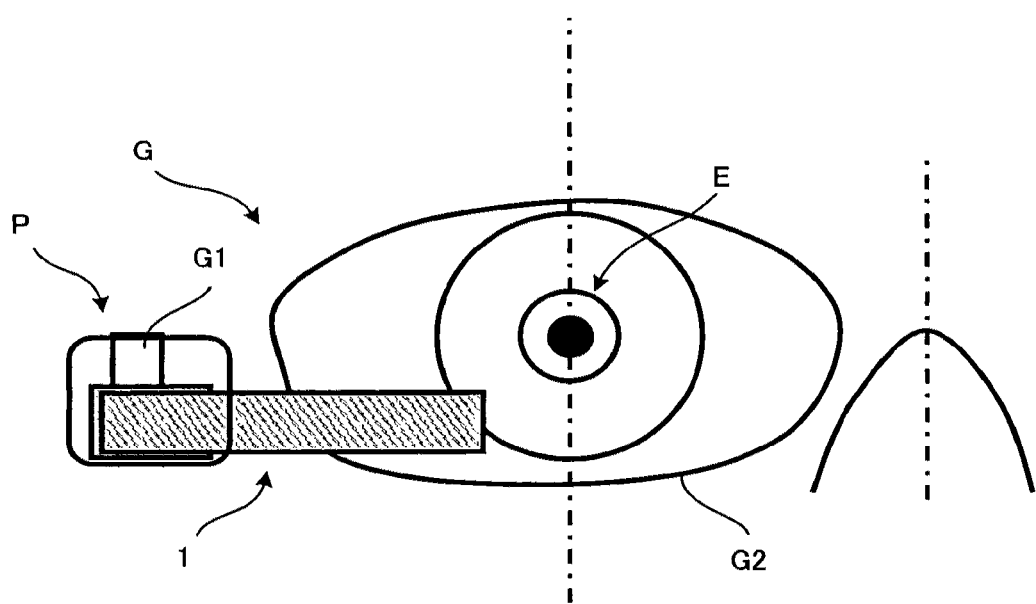
FIG. 13 is a front view of the image display apparatus using the decentration optical system.
Figure 14:
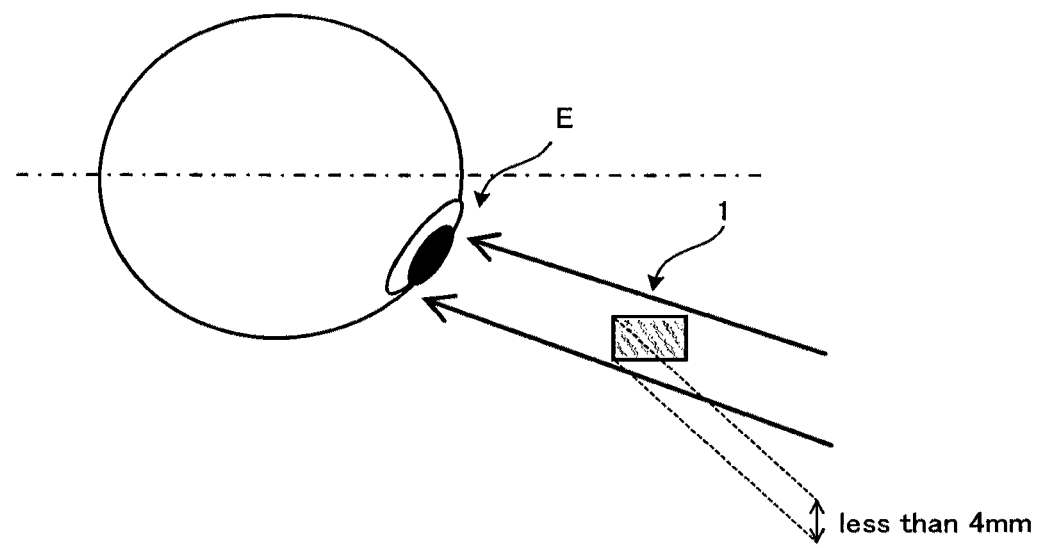
FIG. 14 is a side view of the image display apparatus using the decentration optical system.
Figure 15:
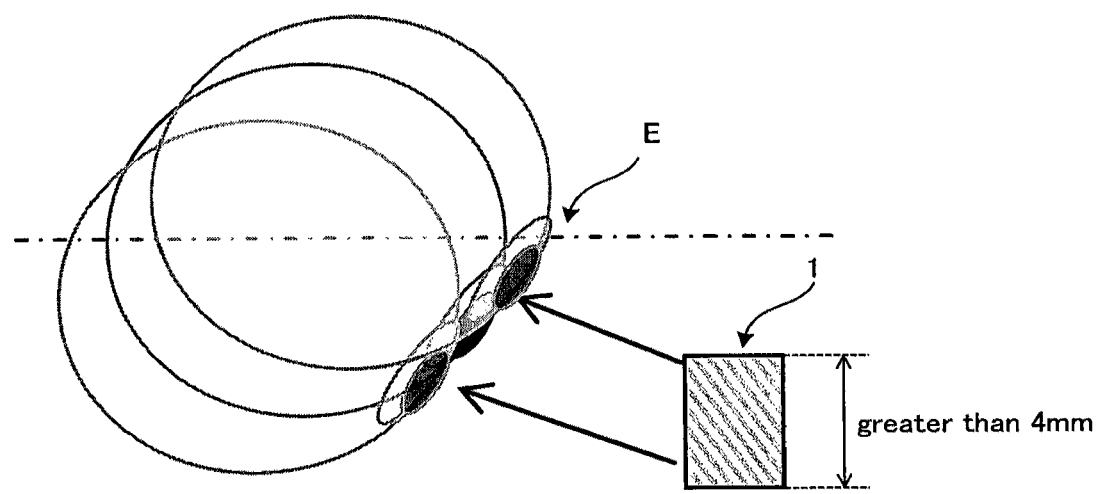
FIG. 15 is a side view of the image display apparatus using the decentration optical system.

FIG. 13 is a side view of the image display apparatus incorporating the decentration optical system, and FIGS. 14 and 15 are side views of the image display apparatus incorporating the decentration optical system.

As depicted in FIG. 13, the decentration optical system 1 is located in opposition to the viewer's pupil E as viewed from front so that enlarged virtual images can be presented to the viewer. With the decentration optical system 1 according to the embodiment here, image-bearing light directed from the image display device 2 toward the front can be turned upwardly into the viewer's eyeball; so the decentration optical system 1 can be positioned below: the decentration optical system 1 or an image projected by it is not in the way to the viewer's field of view.

As the vertical width of the portion of the decentration optical system 1 opposing to the viewer's pupil E is set at less than 4 mm that is a human being's average pupil diameter as shown in FIG. 14, it brings about the see-through feature: scenes behind the decentration optical system 1 are visible to the viewer's pupil E from above and below the decentration optical system 1. Even with the viewer's line of sight turned downward or upon the decentration optical system 1, the viewer can watch outside-world events.

As the vertical width of the portion of the decentration optical system 1 opposing to the viewer's pupil E is set at greater than 4 mm as shown in FIG. 15, there is a longitudinal width long enough to provide a wide tolerance to vertical shifts.

According to the embodiment here, there is an eyeglasses type image display apparatus P proposed that enables the see-through feature: the outside world and electronic images can be simultaneously viewed without intercepting the outside-world field of view, and can be reduced in terms of size, weight and cost.

If, instead of the image display device 2, an imaging device (not shown) is used with the prism optical system 1 of the embodiment here, it is then possible to provide an imaging apparatus that can be reduced in terms of size, weight and cost.

Figure 16:
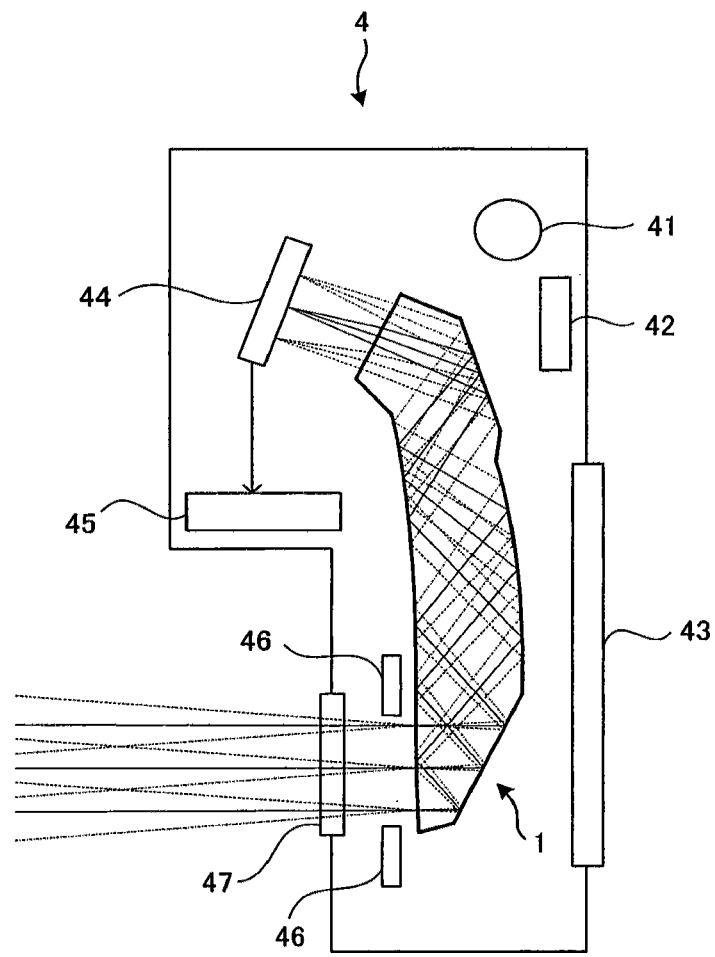
FIG. 16 is illustrative of the basic construction of the imaging apparatus using the prism optical system.

FIG. 16 is illustrative of the basic makeup of an imaging apparatus, viz., a digital camera to which the prism optical system according to the embodiment here is applied. When the inventive prism optical system is applied to the imaging apparatus, the exit pupil of the image display apparatus functions as an entrance pupil, and an aperture stop 46 is located near the pupil position. The aperture of the aperture stop 46 is opened wide or narrow for brightness adjustment. Instead of the display device here, there is a CCD or other imaging device 44 located.

The digital camera body is provided with an entrance window 46 that does just only take light inside but also prevents contamination of the interior, a switch 42, shutter 41, and a rear display panel 43 for checking on operation and the taking of images. As the switch 42 is held on and the shutter 41 is pressed down, it causes a shutter (not shown) affixed to the imaging device 44 to be actuated. Then, still images are taken by the imaging device 44 for a time preset at a shutter speed, and image data are loaded up in an image recording memory 45. For the taking of moving images, moving images taken in the imaging device 44 with the shutter held open are loaded up in the image recording memory 45.

While the present invention has been explained with reference to various embodiments, it is to be understood that the present invention is by no means limited to them, and other embodiments comprising combinations of the requirements and limitations for the invention may fall within the category of the invention too.

What is claimed is:

1. A decentration optical system, comprising at least five optical surfaces, wherein:
    the optical surfaces are each decentered with respect to an axial chief ray in a Y-Z plane in an XYZ coordinate space, and at least one surface is decentered in an X-Z plane orthogonal to the Y-Z plane;
    at least two of the multiple optical surfaces are rotationally asymmetric surfaces;
    at least one of the at least two rotationally asymmetric surfaces is a rotationally asymmetric surface having an X odd-numbered degree term;
    light exiting out from an image display plane for displaying an image enters the decentration optical system and then exits out from the decentration optical system to form an exit pupil for projection onto a viewer's eyeball; and
    the decentration optical system is made up of, in order along a path taken by light from entering the decentration optical system up to exiting out from the decentration optical system, a first surface that is a combined entrance and transmitting surface, a second surface that is an internal reflection surface in opposition to the first surface, a third surface that is a combined internal reflection and exit surface in opposition to the second surface, a fourth surface that is an internal reflection surface in opposition to the third surface and adjacent to the second surface, and a fifth surface that is an internal reflection surface adjacent to the fourth surface and in opposition to the third surface.

2. The decentration optical system according to claim 1, which satisfies:

$$5° \leq \alpha \leq 45°$$

where $\alpha$ is an angle in the X-Z plane that an axial chief ray entering the decenteration optical system forms with an axial chief ray exiting out from the decentration optical system.

3. The decentration optical system according to claim 1, wherein a space formed by the at least five optical surfaces is filled up with an optical medium having a refractive index of 1.3 or greater.

4. The decentration optical system according to claim 1, wherein:
    the third surface has at least one internal reflection that is defined by total reflection.

5. The decentration optical system according to claim 1, wherein:
    the third surface is a rotationally asymmetric surface.

6. The decentration optical system according to claim 1, wherein:
    the third surface has negative power in the Y-Z plane.

7. The decentration optical system according to claim 1, wherein:
    the fourth surface is a rotationally asymmetric surface.

8. The decentration optical system according to claim 1, wherein:
    the fifth surface is a rotationally asymmetric surface.

9. The decentration optical system according to claim 1, wherein:
    the fifth surface has positive power in the Y-Z plane.

10. The decentration optical system according to claim 1, wherein:
    the second surface is a rotationally asymmetric surface.

11. The decentration optical system according to claim 1, wherein:
    the second surface is a surface that is tilted or shifted in the X-Z plane.

12. The decentration optical system according to claim 1, wherein:
    the fifth surface is a surface that is tilted or shifted in the X-Z plane.

13. The decentration optical system according to claim 1, wherein:
    the first surface is a surface that is tilted or shifted in the X-Z plane.

14. The decentration optical system according to claim 1, wherein:
    the third surface is a rotationally asymmetric surface having an X odd-numbered degree term.

15. The decentration optical system according to claim 1, wherein:
    the fifth surface is a rotationally asymmetric surface having an X odd-numbered degree term.

16. The decentration optical system according to claim 1, wherein:
    the second surface is a rotationally asymmetric surface having an X odd-numbered degree term.

17. The decentration optical system according to claim 1, wherein:
    the fourth surface is a rotationally asymmetric surface having an X odd-numbered degree term.

18. An image display apparatus, comprising a decentration optical system as recited in claim 1, wherein:
    an image display device is located in opposition to the first surface, and when a viewer's eyeball is positioned in opposition to a transmitting area of the third surface, an enlarged virtual image is presented to the viewer.

19. The image display apparatus according to claim 18, wherein:
an exit pupil of the decentration optical system is formed near an exit window of the third surface or between the third surface and the viewer's eyeball.

20. The image display apparatus according to claim 18, wherein:
when an image from the image display device is taken in from an entrance surface of the decentration optical system and exits out from an exit surface of the decentration optical system in a substantially parallel light form for projection onto the viewer's eyeball, the image display device is rotated around an axial chief ray ($\gamma$) for location.

21. An imaging apparatus, comprising a decentration optical system as recited in claim 1, wherein:
an imaging device is located in opposition to the first surface,
an aperture stop is located in front of and near a transmitting surface of the third surface, and
an outside world's image is taken.

22. The imaging apparatus according to claim 21, wherein:
when parallel light enters the decentration optical system from an entrance pupil to take images by an imaging device externally of the decentration optical system, the imaging device is rotated around an axial chief ray ($\gamma$) for location.

* * * * *